(12) United States Patent
Ikejiri et al.

(10) Patent No.: US 9,964,881 B2
(45) Date of Patent: May 8, 2018

(54) TONER

(71) Applicant: CANON KABUSHIKI KAISHA, Tokyo (JP)

(72) Inventors: Takuma Ikejiri, Suntou-gun (JP); Yusuke Hasegawa, Suntou-gun (JP); Tomohisa Sano, Mishima (JP); Yoshitaka Suzumura, Mishima (JP); Shohei Yamashita, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/596,693

(22) Filed: May 16, 2017

(65) Prior Publication Data

US 2017/0336727 A1 Nov. 23, 2017

(30) Foreign Application Priority Data

May 20, 2016 (JP) ................................. 2016-101239

(51) Int. Cl.
| | |
|---|---|
| *G03G 9/08* | (2006.01) |
| *G03G 9/087* | (2006.01) |
| *C08G 63/20* | (2006.01) |
| *G03G 9/09* | (2006.01) |

(52) U.S. Cl.
CPC ......... *G03G 9/08755* (2013.01); *C08G 63/20* (2013.01); *G03G 9/0821* (2013.01); *G03G 9/0825* (2013.01); *G03G 9/08711* (2013.01); *G03G 9/0904* (2013.01)

(58) Field of Classification Search
CPC . G03G 9/08755; G03G 9/0821; G03G 9/0825
USPC ............................................ 430/110.1, 111.4
See application file for complete search history.

(56) References Cited

U.S. PATENT DOCUMENTS

| | | | |
|---|---|---|---|
| 6,703,176 | B2 | 3/2004 | Naka et al. |
| 6,803,164 | B2 | 10/2004 | Mizoo et al. |
| 6,953,646 | B2 | 10/2005 | Doujo et al. |
| 7,123,862 | B2 | 10/2006 | Hasegawa et al. |
| 7,160,660 | B2 | 1/2007 | Dojo et al. |
| 7,368,211 | B2 | 5/2008 | Hasegawa et al. |
| 7,470,494 | B2 | 12/2008 | Nishiyama et al. |
| 7,582,401 | B2 | 9/2009 | Ogawa et al. |
| 7,678,523 | B2 | 3/2010 | Hiroko et al. |

(Continued)

FOREIGN PATENT DOCUMENTS

| | | |
|---|---|---|
| JP | 2005172886 A | 6/2005 |
| JP | 2009157221 A | 7/2009 |

(Continued)

OTHER PUBLICATIONS

U.S. Appl. No. 15/490,174, Tomohisa Sano, filed Apr. 18, 2017.
U.S. Appl. No. 15/467,274, Satoshi Arimura, filed Mar. 23, 2017.
U.S. Appl. No. 15/586,732, Yusuke Hasegawa, filed May 4, 2017.

*Primary Examiner* — Mark A Chapman
(74) *Attorney, Agent, or Firm* — Fitzpatrick Cella Harper and Scinto

(57) ABSTRACT

A toner comprising toner particles, each of which contains a binder resin and a colorant, wherein an onset temperature Te (° C.) of a storage elastic modulus E' obtained in a powder dynamic viscoelastic measurement on the toner is at least 50° C. and not more than 70° C., and a value at Te (° C.) of a storage elastic modulus G' obtained in a pellet dynamic viscoelastic measurement on the toner is at least $4.0 \times 10^7$ Pa and not more than $1.0 \times 10^{10}$ Pa.

5 Claims, 3 Drawing Sheets

(56) References Cited

U.S. PATENT DOCUMENTS

| | | |
|---|---|---|
| 7,678,524 B2 | 3/2010 | Hasegawa et al. |
| 7,704,659 B2 | 4/2010 | Ogawa et al. |
| 7,811,734 B2 | 10/2010 | Ogawa et al. |
| 7,923,190 B2 | 4/2011 | Magome et al. |
| 7,935,467 B2 | 5/2011 | Dojo et al. |
| 7,939,231 B2 | 5/2011 | Ogawa et al. |
| 8,084,174 B2 | 12/2011 | Hasegawa et al. |
| 8,124,306 B2 | 2/2012 | Hitata et al. |
| 8,227,162 B2 | 7/2012 | Sano et al. |
| 8,426,091 B2 | 4/2013 | Magome et al. |
| 8,426,094 B2 | 4/2013 | Magome et al. |
| 8,518,620 B2 | 8/2013 | Dojo et al. |
| 8,614,044 B2 | 12/2013 | Matsui et al. |
| 8,778,585 B2 | 7/2014 | Matsui et al. |
| 8,841,054 B2 | 9/2014 | Dojo et al. |
| 8,918,035 B2 | 12/2014 | Hasegawa et al. |
| 9,029,055 B2 | 5/2015 | Aoki et al. |
| 9,097,997 B2 | 8/2015 | Nomura et al. |
| 9,152,065 B2 | 10/2015 | Sano et al. |
| 9,213,250 B2 | 12/2015 | Nomura et al. |
| 9,213,251 B2 | 12/2015 | Ohmori et al. |
| 9,217,943 B2 | 12/2015 | Matsui et al. |
| 9,235,151 B2 | 1/2016 | Tanaka et al. |
| 9,239,528 B2 | 1/2016 | Hasegawa et al. |
| 9,244,371 B2 | 1/2016 | Suzumura et al. |
| 9,377,708 B2 | 6/2016 | Magome et al. |
| 9,454,096 B2 | 9/2016 | Hasegawa et al. |
| 9,551,947 B2 | 1/2017 | Hiroko et al. |
| 9,557,670 B2 | 1/2017 | Shiba et al. |
| 9,625,841 B2 | 4/2017 | Hiroko et al. |
| 9,625,842 B2 | 4/2017 | Uratani et al. |
| 9,658,548 B2 | 5/2017 | Magome et al. |
| 2009/0197192 A1 | 8/2009 | Hiroko et al. |
| 2015/0227067 A1 | 8/2015 | Hasegawa et al. |
| 2015/0227068 A1 | 8/2015 | Sano et al. |
| 2016/0266509 A1 | 9/2016 | Sano et al. |
| 2016/0378003 A1 | 12/2016 | Arimura et al. |
| 2017/0160656 A1 | 6/2017 | Suzumura et al. |
| 2017/0160657 A1 | 6/2017 | Suzumura et al. |
| 2017/0160660 A1 | 6/2017 | Hasegawa et al. |
| 2017/0160661 A1 | 6/2017 | Suzumura et al. |
| 2017/0160662 A1 | 6/2017 | Nagashima et al. |
| 2017/0160663 A1 | 6/2017 | Arimura et al. |

FOREIGN PATENT DOCUMENTS

| | | |
|---|---|---|
| JP | 2010079106 | 4/2010 |
| JP | 2013225096 A | 10/2013 |
| JP | 2015176024 A | 10/2015 |

TONER

BACKGROUND OF THE INVENTION

Field of the Invention

The present invention relates to a toner used in recording methods that use, for example, electrophotography.

Description of the Related Art

At the same time that the transition from analog to digital is going forward with printers and copiers and providing excellent latent image reproducibility and high resolution, there is also demand, associated with the diversification of localities where printers and so forth are being used, for a stable image quality even with use in diverse environments. In particular, when the air conditioner is turned off during a long vacation in localities having large day/night temperature differences, long-term exposure to repeated swings from high temperatures to low temperatures (known as heat cycling) can occur, thus forming a severe environment for the toner. When a toner is stored in such an environment, the surface composition of the toner is susceptible to fluctuation and, for example, the developing performance such as anti-fogging performance ends up undergoing a substantial decline.

Moreover, there is demand for a toner performance that supports satisfactory fixing at low temperatures in order to accommodate the lower energy consumption and higher speeds of printers in recent years. When a printer operates with a lower energy consumption and/or at higher speeds, a small amount of heat is then applied to the toner from the fixing unit and melting by the toner thus readily becomes inadequate. Due to this, the problem occurs of, for example, the generation of a cold offset phenomenon, in which a portion of the incompletely melted toner attaches to the fixing film surface and is then transferred to the paper.

Controlling the viscoelastic properties of the toner has been widely investigated in recent years as a means for improving this fixing performance, as in, for example, Japanese Patent Application Laid-open No. 2010-79106 and Japanese Patent Application Laid-open No. 2013-225096.

SUMMARY OF THE INVENTION

However, with regard to the viscoelastic properties of toners, a new problem can be produced when, in order to improve the low-temperature fixability, the storage elastic modulus of the toner as a whole is reduced in only a certain temperature range or in a broad range from low temperatures to high temperatures. That is, prior to and after toner entry into the fixing nip the toner can melt and spread out too much while melted. In particular, when an image is printed that readily assumes a state in which the toner has a high height on a line, such as fine lines, the toner can undergo excessive melt-spreading whereby the fine lines end up collapsing and the fine line reproducibility is then ultimately reduced.

Thus, room still remained with regard to investigations into having the fine line reproducibility coexist with an enhanced cold offset resistance by the toner and there was room for improvement here.

An object of the present invention is to provide a toner that exhibits an excellent cold offset resistance and an excellent fine line reproducibility and that even when used after heat cycling provides an excellent image in which fogging is suppressed.

The present invention relates to a toner comprising toner particles, each of which contains a binder resin and a colorant, wherein an onset temperature Te (° C.) of a storage elastic modulus E' obtained in a powder dynamic viscoelastic measurement on the toner is at least 50° C. and not more than 70° C., and a value at Te (° C.) of a storage elastic modulus G' obtained in a pellet dynamic viscoelastic measurement on the toner is at least $4.0 \times 10^7$ Pa and not more than $1.0 \times 10^{10}$ Pa.

The present invention can thus provide a toner that exhibits an excellent cold offset resistance and an excellent fine line reproducibility and that even when used after heat cycling provides an excellent image in which fogging is suppressed.

Further features of the present invention will become apparent from the following description of exemplary embodiments (with reference to the attached drawings).

DESCRIPTION OF THE EMBODIMENTS

Figure 1:
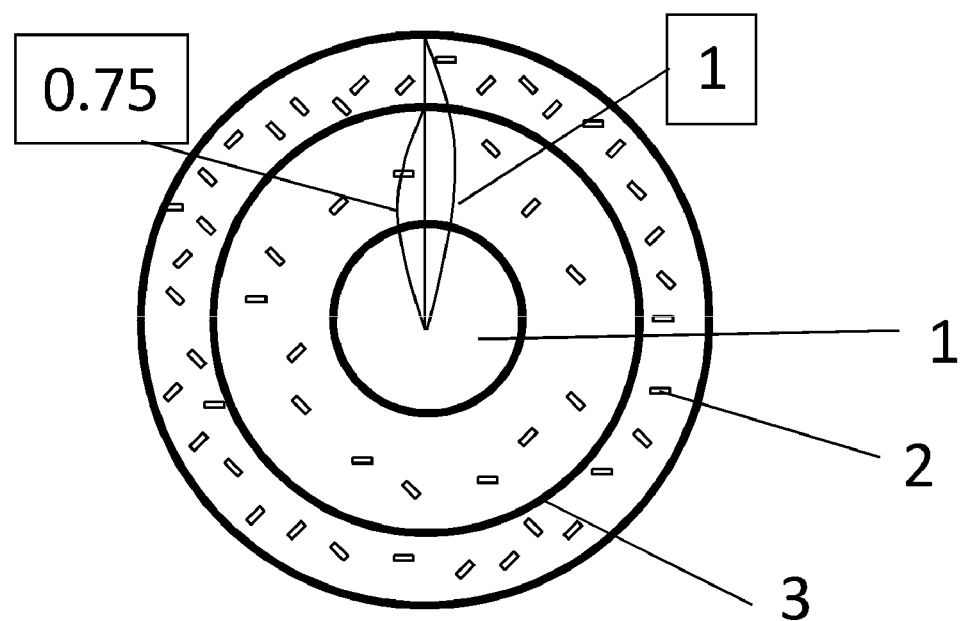
FIG. 1 is a diagram that shows the state of occurrence of domains.
Figure 2:
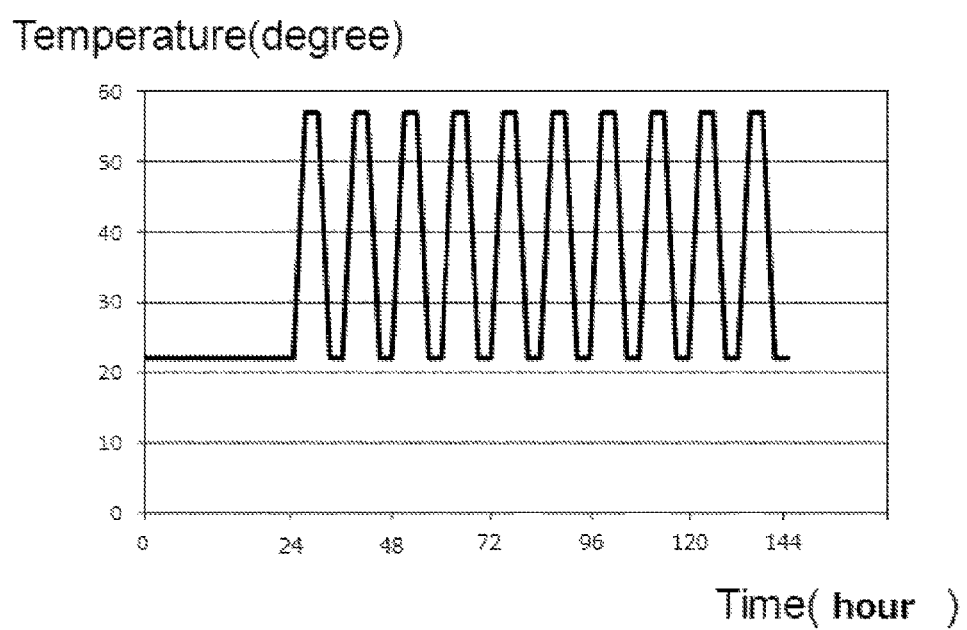
FIG. 2 is a diagram that shows the temperature course during holding under heat cycling in the examples.

Unless specifically indicated otherwise, expressions such as "at least XX and not more than YY" and "XX to YY" that show numerical value ranges refer in the present invention to numerical value ranges that include the lower limit and upper limit that are the end points.

Fixing by the application of heat and pressure is a general method for fixing a toner image to a transfer medium, e.g., paper. In this method, fixing is performed by carrying out forward transport while effecting contact, under the application of pressure, between a toner image on the paper and a heated fixing member. When the temperature of the heating roller is too low when this is done, the toner is not adequately melted and a temperature gradient is generated in the interior of the toner layer. The temperature at the interface between the paper surface and the lowermost side of the toner layer will then not be a temperature sufficient to bring about melting of the toner and the toner layer will undergo fracture. This results in the occurrence of a problem known as cold offset whereby, during passage through the fixing nip, the toner attaches onto the fixing film and after one rotation in this condition is fixed on the paper.

In the case of a high toner laid-on level on the paper in the printing of a high print percentage image, such as a full-surface solid image, production of the cold offset phenomenon readily occurs because a small amount of heat is applied per single toner particle. Through their investigations, the present inventors found—for toner on paper in a solid image fixed at the lowest temperature at which cold offset did not occur—that fixing had occurred in a state in which agglomerates remained and only the surface was melted and continuous and that toner particles were surface-bonded to other toner particles. That is, cold offset was understood to be a phenomenon that occurred through defective toner particle-to-toner particle adherence.

Accordingly, a necessary condition for the suppression of cold offset is that the toner particle surface must melt and exhibit viscosity at lower temperatures to bring about an improved toner particle-to-toner particle adherence.

On the other hand, the fine line reproducibility by the toner ends up being reduced when the melting temperature of the toner is simply reduced in pursuit of an improved toner particle-to-toner particle adherence.

The problem with the fine line reproducibility occurs due to the following: with a fine line printed area having a high height for the toner on the line, the highly stacked-up toner, undergoing excessive melting during passage through the fixing nip, is crushed, resulting in collapse of the fine line. For example, a characteristic feature of single-component jumping development using a magnetic toner is the large amount of toner development per unit area for fine lines such as character images, which facilitates the occurrence of this problem. In order to improve the fine line reproducibility, a design in which the toner particle as a whole does not end up being crushed and thus an optimization of the elasticity of the toner particle as a whole then become necessary.

In order to bring about coexistence between the fixing performance and elasticity of the toner, a structure can be contemplated that has a high softening point material in the interior of the toner particle and a low softening point material, e.g., release agent and so forth, in the surface layer part of the toner particle. However, the heat-resistant storability can decline when a large amount of a low-molecular weight component is present in the surface layer of the toner particle. For example, storage in the aforementioned heat cycling environment produces the problem of a softening of the release agent compatibilized in the binder resin. When this problem occurs, it has an influence on the charge stability and flowability of the toner after holding in the heat cycling environment and the developing performance such as anti-fogging performance can end up undergoing a substantial decline.

Thus, coexistence between the cold offset resistance and fine line reproducibility has heretofore been problematic, and the suppression of fogging after heat cycling has also been quite difficult.

As a result of detailed investigations by the present inventors, it was discovered that a high degree of control of the viscoelastic behavior of the toner particle surface and interior is crucial. Specifically, the viscoelastic behavior of the surface and interior of the toner particle could be controlled through the numerical values obtained in two measurement methods, i.e., for the storage elastic modulus E' obtained by a powder dynamic viscoelastic measurement, and the storage elastic modulus G' obtained by a pellet dynamic viscoelastic measurement.

As a result of additional detailed investigations by the present inventors, coexistence between the cold offset resistance and fine line reproducibility and a suppression of fogging after heat cycling were made possible by the onset temperature Te (° C.) for the storage elastic modulus E' obtained in a powder dynamic viscoelastic measurement being at least 50° C. and not more than 70° C. and by the value at Te (° C.) of the storage elastic modulus G' obtained in a pellet dynamic viscoelastic measurement on the toner being at least $4.0 \times 10^7$ Pa and not more than $1.0 \times 10^{10}$ Pa.

The invention is described in detail in the following.

Measurement of the powder dynamic viscoelasticity can be carried on the toner in the form of a powder. As a result of their investigations, the present inventors discovered that, by adjusting the ramp rate in the powder dynamic viscoelastic measurement, the onset temperature Te (° C.) for the measured storage elastic modulus E' correlated with the viscoelasticity of the toner particle surface. In conventional viscoelastic measurements, the measurement is generally performed after the toner has been molded using heat and/or pressure, and the surface properties of the toner particle and the state of existence of the interior of the toner particle have thus ended up being altered.

Due to the measurement of the powder dynamic viscoelasticity being carried out on the toner in the form of a powder in the present invention, it is thought that the state of the toner particle surface is reflected in the measurement results. Because the onset temperature is the temperature at which the elastic modulus of the toner begins to decline and viscousness begins to appear, the present inventors thought that Te in the powder dynamic viscoelastic measurement represents the temperature at which the toner particle surface begins to melt.

When the onset temperature Te for the storage elastic modulus E' is at least 50° C. and not more than 70° C., melting of the surface layer of the toner particle then occurs at low temperatures and the generation of cold offset and the generation of fogging post-heat cycling can be suppressed. When Te is less than 50° C., after the toner has undergone heat cycling, the toner particle surface will have undergone excessive softening and the charge stability and flowability are reduced and fogging is produced due to, e.g., burying of the external additive. When Te is higher than 70° C., surface layer melting does not occur at low temperatures and the cold offset resistance ends up declining when the amount of heat applied from the fixing unit is small. This Te is preferably at least 50° C. and not more than 65° C.

The onset temperature Te for the storage elastic modulus E' according to powder dynamic viscoelastic measurement can be controlled by adjusting the molecular weight of the resin used in the toner, the amount of tetrahydrofuran (THF)-insoluble matter, and the type, amount, and location of occurrence of crystalline materials such as the release agent and crystalline polyester.

The pellet dynamic viscoelastic measurement is described in the following. In the pellet dynamic viscoelastic measurement, the viscoelasticity is measured by the application of heat and force to the toner that has been molded and pelletized at 120° C. Accordingly, there is little influence from the state of the toner particle surface or interior and the viscoelasticity of the toner particle as a whole can be measured. It was discovered in investigations by the present inventors that coexistence between the cold offset resistance and fine line reproducibility could be brought about by having the value at Te (° C.) of the storage elastic modulus G' obtained by pellet dynamic viscoelastic measurement be at least $4.0 \times 10^7$ Pa and not more than $1.0 \times 10^{10}$ Pa.

The value of G' at Te represents the elasticity of the toner as a whole at a temperature where surface softening of the toner particle occurs. The value of G' at Te (° C.) is indicated by G'(Te) in the following. When G'(Te) is in the indicated range, toner particle-to-toner particle surface adhesion can be brought about in the toner at the low temperatures in the vicinity of Te(° C.) while maintaining the aggregates. Due to this, it is hypothesized that during fixing, nothing remains on the fixing film side and the elasticity of the toner particle as a whole is maintained and excessive collapse under the effects of heat and pressure does not occur, and as a consequence coexistence between the cold offset resistance and fine line reproducibility becomes possible.

When the value of G'(Te) is less than $4.0 \times 10^7$ Pa, the toner particle as a whole also becomes soft at the temperature at which the surface begins to soften, and due to this the stacked-up toner at fine lines collapses and the fine line reproducibility ends up declining. In addition, a practical toner elasticity is not present for a toner having a value of G'(Te) larger than $1.0 \times 10^{10}$ Pa. The value of G'(Te) is preferably at least $1.0 \times 10^8$ Pa and not more than $2.0 \times 10^9$ Pa.

The value of the storage elastic modulus G'(Te) provided by pellet dynamic viscoelastic measurement can be controlled by adjusting the molecular weight of the resin used in the toner, the amount of tetrahydrofuran (THF)-insoluble matter, and the type and amount of crystalline materials such as the release agent and crystalline polyester.

Thus, coexistence between the cold offset resistance and the fine line reproducibility can be brought about by regulation of the onset temperature Te (° C.) for the storage elastic modulus E' obtained by powder dynamic viscoelastic measurement and the value of the storage elastic modulus G' obtained by pellet dynamic viscoelastic measurement. Thus, a toner having a Te of at least 50° C. and not more than 70° C. and a G'(Te) of at least $4.0 \times 10^7$ Pa and not more than $1.0 \times 10^{10}$ Pa exhibits an excellent cold offset resistance because surface melting of the toner particles starts at low temperatures of not more than 70° C. In addition, due to the occurrence, at the surface melting commencement temperature of the toner particles, of surface-adhesion between toner particles that maintain elasticity for the toner particle as a whole, the fine lines also become fixable without excessive collapse and the fine line reproducibility is then excellent.

Preferred embodiments of the toner of the present invention are described in the following, but this should not be construed as a limitation to or by their description.

The method for controlling the target viscoelastic behavior of the toner of the present invention can be exemplified by control of the amount and state of occurrence of crystalline materials, i.e., the release agent and crystalline polyester, in the interior of the toner particle. In addition, for a toner having a core-shell structure, it is thought that this is achieved by designing a high elasticity for the core portion and by using a low melting point material for the shell portion.

In the present invention, small domains of a crystalline material having a long diameter of at least 50 nm and not more than 500 nm are preferably present in the toner particle cross section observed with a scanning transmission electron microscope (STEM). The average number of small domains observed in the toner particle cross section is preferably at least 50 and not more than 500 and is more preferably at least 100 and not more than 500. That is, it is preferred in the present invention that a plurality of relatively small domains, as indicated above, are formed in the toner particle as crystalline material domains. Such a state in which small domains are present in the interior of the toner particle is referred to as "a dispersion of small domains". Having the size and number of crystalline material small domains be in the indicated ranges is preferred because the crystalline material can then efficiently outmigrate to the toner particle surface in the vicinity of the melting point of the crystalline material and the viscoelastic characteristics of the toner particle surface are easily controlled into the ranges of the present invention.

The size and number of the small domains can be adjusted through the amount and type of crystalline material and through the toner production method, see below.

In the present invention, crystalline material domains are preferably present in the toner particle cross section observed with a scanning transmission electron microscope (STEM). In addition, preferably at least 60 number % and not more than 100 number % of these crystalline material domains are present in the region that is within 25%, from the contour of the toner particle cross section, of the distance between this contour and the center point of the cross section. At least 70 number % and not more than 100 number % is more preferred.

With regard to the occurrence of these domains, preferably at least 60 number % of the domains, based on the total number of domains, is present in the region that is within 25%, from the contour of the toner particle cross section, of the distance between this contour and the center point of the cross section, as shown in FIG. 1. This occurrence (number %) of the crystalline material domains is referred to as the "25% ratio" in the present invention. The 25% ratio can be controlled through the acid value of the crystalline material.

By controlling the location of occurrence of the crystalline material into the range indicated above, the binder resin can then be instantaneously plasticized when heat is applied to the toner during fixing. In addition, the elasticity of the toner as a whole can be maintained since the region in the vicinity of the toner particle surface can be efficiently plasticized.

In the present invention, large domains of crystalline material having a long diameter of at least 1.0 µm and not more than 4.0 µm are preferably present in the toner particle cross section observed with a scanning transmission electron microscope. In addition, the area taken up by these large domains preferably occupies at least 10.0% and not more than 40.0% of the area of the toner particle cross section. More preferably, the long diameter of the large domains is at least 1.0 µm and not more than 3.6 µm, and the area taken up by the large domains occupies at least 10.0% and not more than 38.5% of the area of the toner particle cross section. The crystalline material present as domains is relatively stable to heat since it is crystallized. By having the long diameter and area of the large domains be in the indicated ranges, large amounts of the crystalline material can be incorporated in the toner particle interior and the release effects and plasticizing effects are then satisfactorily expressed and the cold offset resistance and fogging postheat cycling are improved.

Materials that are relatively resistant to compatibilizing with the binder resin are preferred for the crystalline material used to form these large domains. Such crystalline materials readily form large domains of crystalline material that is phase-separated from the binder resin in the toner particle interior. The size and number of the large domains can be adjusted through the amount and type of the crystalline material and the toner production method, see below.

Known materials, e.g., crystalline polyester, release agent, and so forth, can be used as the crystalline material usable in the present invention, but the co-use of a crystalline polyester and release agent is preferred in order to satisfactorily express the effects of the domains and control to the viscoelastic properties desired for the present invention. In particular, when crystalline polyester is dispersed in the toner interior as the small domains and a release agent is contained in the crystalline material constituting the large domains, plasticity is readily expressed by both the crystalline polyester and release agent and the rapid outmigration of the release agent in large amounts to the toner particle surface can be brought about. This is thought to be due to the following: during fixing, the crystalline polyester first softens the surrounding resin and the release agent passes through the softened region and goes on to outmigrate to the toner particle surface. That is, preferably the small domains contain crystalline polyester and the large domains contain release agent, and more preferably the small domains originate from crystalline polyester and the large domains originate from release agent.

Here, crystalline refers to the presence of a clear endothermic peak in differential scanning calorimetric (DSC) measurement.

Toner particles that contain within the single particle both crystalline polyester domains and release agent domains (these toner particles are also referred to as "Tcw" below) in the toner particle cross section observed with a scanning transmission electron microscope are preferably present in at least 70 number % of the toner in the present invention. The Tcw percentage is more preferably at least 80 number %. On the other hand, there are no particular limitations on the upper limit, but it is preferably not more than 100 number %.

In addition, in the particle group composed of toner particles in which crystalline polyester domains and release agent domains are observed in a single particle, the average coverage ratio by the crystalline polyester domains of the release agent large domains having a long diameter of at least 1.0 μm and not more than 4.0 μm (more preferably at least 1.0 μm and not more than 3.6 μm) is preferably at least 80%. At least 85% is more preferred. On the other hand, there are no particular limitations on the upper limit, but it is preferably not more than 100%.

When the aforementioned range is satisfied, this indicates that the crystalline polyester substantially covers the release agent large domains in many toner particles. Considering the behavior in the fixing step, the crystalline polyester nearer the surface first melts when heat is applied to the toner particle, and the release agent in the interior then also starts to melt. The crystalline polyester spreads into the toner particle interior while plasticizing the surrounding binder resin, and when this occurs, the melted release agent passes through the region plasticized by the crystalline polyester and goes on to outmigrate to the toner particle surface. Through this action, it is thought that the plasticity of both the crystalline polyester and release agent are thoroughly expressed and the rapid outmigration of the release agent in large amounts to the toner particle surface is brought about, and as a result a substantial release performance can be exhibited and the cold offset resistance is improved.

The coverage by the crystalline polyester domains of the release agent large domains having a long diameter of at least 1.0 μm and not more than 4.0 μm at the average coverage ratio of at least 80% can be achieved through adjustment of the amount and type of the crystalline polyester and release agent.

Crystalline polyester that can be used as the crystalline material in the present invention will now be described.

While known crystalline polyesters can be used, the crystalline polyester preferably is a saturated polyester. Polyesters derived from aliphatic dicarboxylic acid and aliphatic diol are more preferred, and polyesters having a structure in which aliphatic monocarboxylic acid is condensed at the terminal position are more preferred. Aliphatic monocarboxylic acid is preferred because it supports facile adjustment of the molecular weight and hydroxyl value and in addition enables control of the affinity with the release agent. The following are examples of usable monomers.

The aliphatic dicarboxylic acid can be exemplified by oxalic acid, malonic acid, succinic acid, glutaric acid, adipic acid, pimelic acid, suberic acid, azelaic acid, sebacic acid, dodecanedioic acid, hexadecanedicarboxylic acid, and octadecanedicarboxylic acid.

The aliphatic diol can be exemplified by ethylene glycol, diethylene glycol, triethylene glycol, 1,2-propanediol, 1,3-propanediol, dipropylene glycol, trimethylene glycol, neopentyl glycol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,16-hexadecanediol, and 1,18-octadecanediol.

The aliphatic monocarboxylic acid can be exemplified by decanoic acid (capric acid), dodecanoic acid (lauric acid), tetradecanoic acid (myristic acid), hexadecanoic acid (palmitic acid), octadecanoic acid (stearic acid), eicosanoic acid (arachidic acid), docosanoic acid (behenic acid), and tetracosanoic acid (lignoceric acid).

Here, since a monocarboxylic acid has a single carboxy group, the structure derived from monocarboxylic acid is located at the terminal position of the crystalline polyester.

Such a crystalline polyester has a high affinity for wax. As a result, the crystalline polyester assumes a configuration of coating the wax and the crystalline polyester domains tend to be thermally stabilized, and properties such as the fogging are then resistant to a reduction even after exposure to a history of a high-temperature severe environment. Moreover, the surrounding binder resin is instantaneously plasticized by the simultaneous melting of the crystalline polyester and wax and a synergetic improvement in the back end offset is facilitated.

The ability to withstand severe environments and the back end offset, which are prone to reside in a trade-off relationship, are readily made to coexist with each other through the use of a crystalline polyester as described above, which is thus preferred for the structure of the crystalline polyester.

In particular, the use of an ester wax having at least 2 and not more than 6 ester groups in each molecule in combination with a crystalline polyester that uses an aliphatic monocarboxylic acid having at least 10 and not more than 24 carbons, i.e., that has an alkyl group having at least 10 and not more than 24 carbons in terminal position, is preferred because, due to the high affinity between the two, the coverage ratio by the crystalline polyester for the wax is then substantially increased. While the details are considered below, a higher cooling rate in the cooling step in the toner production process further facilitates an increase in this trend and is thus preferred.

The affinity with the ester wax is increased still further and the coverage ratio by the crystalline polyester for the release agent also tends to increase when in the present invention the crystalline polyester has in terminal position a structure derived from an acid monomer selected from lauric acid, stearic acid, and behenic acid, and this is thus preferred.

The crystalline polyester used in the present invention can be produced by common polyester synthesis methods. For example, it can be obtained by carrying out an esterification reaction or a transesterification reaction between the dicarboxylic acid component and diol component followed by reducing the pressure or introducing nitrogen gas and carrying out a polycondensation reaction according to a common method.

As necessary, a common esterification catalyst or transesterification catalyst can be used in the esterification or transesterification reaction, e.g., sulfuric acid, tertiary-butyltitanium butoxide, dibutyltin oxide, manganese acetate, magnesium acetate, and so forth. In addition, a common polymerization catalyst, for example, a known polymerization catalyst such as tertiary-butyltitanium butoxide, dibutyltin oxide, tin acetate, zinc acetate, tin disulfide, antimony trioxide, germanium dioxide, and so forth, can be used for the polymerization. There are no particular limitations on the polymerization temperature and amount of catalyst and these may be freely selected as necessary.

A titanium catalyst is desirably used as the catalyst and a chelate-type titanium catalyst is more desirable. This is because titanium catalysts have a suitable reactivity and provide a polyester having a molecular weight distribution desirable for the present invention.

The weight-average molecular weight (Mw) of the crystalline polyester is preferably at least 10,000 and not more than 60,000 and more preferably at least 20,000 and not more than 45,000. This facilitates phase separation by the crystalline polyester from the binder resin in the toner production process and also increases the ability to withstand severe environments, e.g., heat cycling.

The weight-average molecular weight (Mw) of the crystalline polyester can be controlled using the various conditions in the production of the crystalline polyester.

The hydroxyl value (mg KOH/g) of the crystalline polyester is preferably kept down from the standpoint of increasing the coverage ratio of the release agent by the crystalline polyester. This is thought to be due to a higher affinity with the release agent when the crystalline polyester has fewer OH groups. Specifically, it is not more than 40.0. Not more than 30.0 is preferred and not more than 10.0 is more preferred.

In addition, just as for the hydroxyl value, the acid value (mg KOH/g) of the crystalline polyester is preferably kept low from the standpoint of increasing the coverage ratio of the release agent by the crystalline polyester. Specifically, it is not more than 8.0. It is more preferably not more than 5.0 and is even more preferably not more than 4.5.

In the suspension polymerization method, which is a preferred production method for the present invention, controlling the acid value into the indicated range facilitates the presence of the crystalline polyester in the vicinity of the surface layer of the toner particle. Accordingly, it is possible to raise the ratio of the crystalline material domains that are present in the region within 25%, from the toner particle surface, of the distance between the surface and the center point.

The content of crystalline polyester in the toner is preferably at least 3.0 mass parts and not more than 20.0 mass parts as the total amount per 100 mass parts of the binder resin.

Control to the viscoelasticity of the present invention is readily achieved when the crystalline polyester content is in the indicated range. At least 3.0 mass parts and not more than 12.0 mass parts per 100 mass parts of the binder resin is more preferred.

When the crystalline polyester content is not more than 20.0 mass parts, outmigration by the crystalline polyester to the toner particle surface is impeded and as a result the charging performance and flowability of the toner become uniform and suppression of the fogging after heat-cycling storage is facilitated.

The release agent is described in the following. A release agent may be used as crystalline material in the present invention. The release agent can be exemplified by aliphatic hydrocarbon waxes such as low molecular weight polyethylene, low molecular weight polypropylene, microcrystalline wax, Fischer-Tropsch waxes, and paraffin waxes; oxides of aliphatic hydrocarbon waxes, such as oxidized polyethylene wax, and their block copolymers; waxes in which the major component is fatty acid ester, such as carnauba wax and montanic acid ester waxes, and waxes provided by the partial or complete deacidification of fatty acid esters, such as deacidified carnauba wax; saturated straight-chain fatty acids such as palmitic acid, stearic acid, and montanic acid; unsaturated fatty acids such as brassidic acid, eleostearic acid, and parinaric acid; saturated alcohols such as stearyl alcohol, aralkyl alcohols, behenyl alcohol, carnaubyl alcohol, ceryl alcohol, and melissyl alcohol; polyhydric alcohols such as sorbitol; fatty acid amides such as linoleamide, oleamide, and lauramide; saturated fatty acid bisamides such as methylenebisstearamide, ethylenebiscapramide, ethylenebislauramide, and hexamethylenebisstearamide; unsaturated fatty acid amides such as ethylenebisoleamide, hexamethylenebisoleamide, N,N'-dioleyladipamide, and N,N'-dioleylsebacamide; aromatic bisamides such as m-xylenebisstearamide and N,N'-distearylisophthalamide; fatty acid metal salts (generally known as metal soaps) such as calcium stearate, calcium laurate, zinc stearate, and magnesium stearate; waxes provided by grafting an aliphatic hydrocarbon wax using a vinylic monomer such as styrene or acrylic acid; partial esters between a polyhydric alcohol and a fatty acid, such as behenic monoglyceride; and hydroxyl group-containing methyl ester compounds obtained, for example, by the hydrogenation of plant oils.

In the suspension polymerization method, which is one method of producing the toner of the present invention, in order to disperse release agent small domains in the toner particle, preferably a release agent is used that is readily soluble in the binder resin and a cooling step as described below is carried out.

The affinity with the crystalline polyester is readily controlled in the present invention when an aliphatic hydrocarbon wax is used in combination with a wax (referred to as ester wax hereinafter) having a fatty acid ester as its main component, which is thus preferred.

Examples of ester waxes that can be advantageously used in the present invention are given below. The level of functionality referenced below represents the number of ester groups present in each molecule. For example, behenyl behenate is a monofunctional ester wax, while dipentaerythritol hexabehenate is referred to as a hexafunctional ester wax.

The condensate of a long-chain carboxylic acid with an aliphatic alcohol having 6 to 12 carbons and the condensate of a long-chain alcohol with an aliphatic carboxylic acid having 4 to 10 carbons can be used as a monofunctional ester wax. Any long-chain carboxylic acid and long-chain alcohol can be used here.

Examples of the aliphatic alcohol are 1-hexanol, 1-heptanol, 1-octanol, 1-nonanol, 1-decanol, undecyl alcohol, and lauryl alcohol. Examples of the aliphatic carboxylic acid are pentanoic acid, hexanoic acid, heptanoic acid, octanoic acid, nonanoic acid, and decanoic acid.

The condensate of a dicarboxylic acid and a monoalcohol and the condensate of a diol and a monocarboxylic acid can be used as a difunctional ester wax.

The dicarboxylic acid can be exemplified by adipic acid, pimelic acid, suberic acid, azelaic acid, sebacic acid, and dodecanedioic acid.

The diol can be exemplified by 1,6-hexanediol, 1,7-heptanediol, 1,8-octanediol, 1,9-nonanediol, 1,10-decanediol, 1,11-undecanediol, and 1,12-dodecanediol.

An aliphatic alcohol is preferred for the monoalcohol to be condensed with the dicarboxylic acid. Specific examples are tetradecanol, pentadecanol, hexadecanol, heptadecanol, octadecanol, nonadecanol, eicosanol, docosanol, tricosanol, tetracosanol, pentacosanol, hexacosanol, and octacosanol. Among these, docosanol is preferred from the standpoint of the fixing performance and developing performance.

An aliphatic carboxylic acid is preferred for the monocarboxylic acid to be condensed with the diol. Specific examples of fatty acids are lauric acid, myristic acid, palmitic acid, margaric acid, stearic acid, tuberculostearic acid, arachidic acid, behenic acid, lignoceric acid, and cerotic acid. Behenic acid is preferred among the preceding from the standpoint of the fixing performance and developing performance.

Linear fatty acids and linear alcohols are provided here as examples, but a branched structure may also be present.

Trifunctional and higher functional ester waxes may also be used. Examples for obtaining trifunctional and higher functional ester waxes are provided here.

The condensate of a glycerol compound with a monofunctional aliphatic carboxylic acid is an example of a trifunctional ester wax. The condensate of pentaerythritol and a monofunctional aliphatic carboxylic acid and the condensate of diglycerol with a carboxylic acid are examples of tetrafunctional ester waxes. The condensate of triglycerol with a monofunctional aliphatic carboxylic acid is an example of a pentafunctional ester wax. The condensate of dipentaerythritol and a monofunctional aliphatic carboxylic acid and the condensate of tetraglycerol and a monofunctional aliphatic carboxylic acid are examples of hexafunctional ester waxes.

At least difunctional and not more than hexafunctional ester waxes are preferred because they readily engage in the formation of crystalline polyester-covered domains.

The content of the release agent in the toner is, as the total amount thereof per 100 mass parts of the binder resin, preferably at least 2.5 mass parts and not more than 35.0 mass parts and more preferably at least 4.0 mass parts and not more than 30.0 mass parts. When the release agent content is not more than 35.0 mass parts, it is difficult for the release agent to outmigrate to the toner particle surface and as a result the toner charging performance and flowability become uniform and the generation of fogging after heat-cycling storage is inhibited.

The main component of the binder resin is preferably a styrene-acrylic resin in the present invention. Main component indicates a content thereof of at least 50 mass %.

Because crystalline polyesters have the characteristic of being readily compatible in binder resins, crystalline polyesters are prone to be present at the toner particle surface and readily produce a decline in the charge stability of the toner. In particular, crystalline polyester compatibilized into the binder resin readily outmigrates to the toner particle surface through use in a high-temperature severe environment, e.g., heat cycling.

With styrene-acrylic resins, due to their poor compatibility with crystalline polyester, the degree of crystallinity of the crystalline polyester is readily increased. As a consequence, a styrene-acrylic resin is preferably the main component of the binder resin.

The preferred content of the styrene-acrylic resin with reference to the binder resin is at least 80 mass % and not more than 100 mass %.

The polymerizable monomer for producing the styrene-acrylic resin can be exemplified by the following.

Styrenic polymerizable monomers can be exemplified by styrene and styrenic polymerizable monomers such as α-methylstyrene, o-methylstyrene, m-methylstyrene, p-methylstyrene, and p-methoxystyrene.

Acrylic polymerizable monomers can be exemplified by acrylic polymerizable monomers such as methyl acrylate, ethyl acrylate, n-propyl acrylate, isopropyl acrylate, n-butyl acrylate, isobutyl acrylate, tert-butyl acrylate, n-hexyl acrylate, 2-ethylhexyl acrylate, n-octyl acrylate, and cyclohexyl acrylate.

Methacrylic polymerizable monomers can be exemplified by methacrylic polymerizable monomers such as methyl methacrylate, ethyl methacrylate, n-propyl methacrylate, isopropyl methacrylate, n-butyl methacrylate, isobutyl methacrylate, tert-butyl methacrylate, n-hexyl methacrylate, 2-ethylhexyl methacrylate, and n-octyl methacrylate.

There are no particular limitations on the method of producing the styrene-acrylic resin and a known method can be used. In addition, combinations of other known resins can also be used for the binder resin. For the toner of the present invention, the tetrahydrofuran (THF)-insoluble matter in the resin component of the toner is preferably at least 10 mass % and not more than 50 mass % with reference to the resin component. This supports facile control of the viscoelastic properties of the toner.

This tetrahydrofuran (THF)-insoluble matter in the present invention can be adjusted through the amount and type of the crosslinking agent in toner particle production and through the polymerization conditions.

In addition, the peak molecular weight (Mp) in the molecular weight distribution measured by gel permeation chromatography on the tetrahydrofuran (THF)-soluble matter of the toner is preferably at least 12,000 and not more than 28,000 in the toner of the present invention. At least 15,000 and not more than 26,000 is more preferred.

Control of the viscoelastic properties of the toner are facilitated by having the peak molecular weight (Mp) be at least 12,000 and not more than 28,000, which is thus preferred.

This peak molecular weight (Mp) can be adjusted in the present invention using the amount and type of the polymerization initiator in toner particle production and the polymerization conditions.

The colorant used in the present invention is exemplified by the following organic pigments, organic dyes, and inorganic pigments.

Cyan colorants can be exemplified by copper phthalocyanine compounds and derivatives thereof, anthraquinone compounds, and basic dye lake compounds. Specific examples are as follows: C.I. Pigment Blue 1, 7, 15, 15:1, 15:2, 15:3, 15:4, 60, 62, and 66.

Magenta colorants can be exemplified by the following: condensed azo compounds, diketopyrrolopyrrole compounds, anthraquinone compounds, quinacridone compounds, basic dye lake compounds, naphthol compounds, benzimidazolone compounds, thioindigo compounds, and perylene compounds. Specific examples are as follows: C.I. Pigment Red 2, 3, 5, 6, 7, 23, 48:2, 48:3, 48:4, 57:1, 81:1, 122, 144, 146, 150, 166, 169, 177, 184, 185, 202, 206, 220, 221, and 254 and C.I. Pigment Violet 19.

Yellow colorants can be exemplified by condensed azo compounds, isoindolinone compounds, anthraquinone compounds, azo-metal complexes, methine compounds, and allylamide compounds. Specific examples are as follows: C.I. Pigment Yellow 12, 13, 14, 15, 17, 62, 74, 83, 93, 94, 95, 97, 109, 110, 111, 120, 127, 128, 129, 147, 151, 154, 155, 168, 174, 175, 176, 180, 181, 185, 191, and 194.

Black colorants can be exemplified by carbon black and by those provided by color mixing using the aforementioned yellow colorants, magenta colorants, cyan colorants, and magnetic powders to give a black color.

A single one of these colorants may be used or a mixture may be used and these colorants may also be used in a solid solution state. The colorant used in the present invention is selected considering the hue angle, chroma, lightness, lightfastness, OHP transparency, and dispersibility in the toner.

In addition, among the preceding, a magnetic powder is preferred for the toner of the present invention from the standpoint of adjusting the thermal conductivity of the toner into the desired range. The toner of the present invention is also preferably produced in an aqueous medium from the standpoint of controlling the thermal conductivity.

The thermal conductivity value of toner preferably used by the present invention is at least 0.190 W/mK and not more than 0.300 W/mK. Within this range, a favorable ease of toner-to-toner heat transmission is obtained and as a consequence the cold offset resistance and the hot offset resistance are improved. A more preferred value for the thermal conductivity is at least 0.230 W/mK and not more than 0.270 W/mK.

When a magnetic powder is used as a colorant in the toner of the present invention, the magnetic powder preferably has as its main component a magnetic iron oxide such as triiron tetroxide or γ-iron oxide. It may also contain an element such as phosphorus, cobalt, nickel, copper, magnesium, manganese, aluminum, silicon, and so forth. This magnetic powder has a BET specific surface area by the nitrogen adsorption method preferably of at least 2 $m^2$/g and not more than 30 $m^2$/g and more preferably of at least 3 $m^2$/g and not more than 28 $m^2$/g. Its Mohs hardness is preferably at least 5 and not more 7. The shape of the magnetic powder is, for example, polyhedral, octahedral, hexahedral, spherical, acicular, or scale, and a low-anisotropy magnetic powder, e.g., polyhedral, octahedral, hexahedral, spherical, and so forth, is preferred from the standpoint of increasing the image density.

The amount of colorant addition is preferably at least 1 mass part and not more than 20 mass parts per 100 mass parts of the binder resin or polymerizable monomer that produces the binder resin. When a magnetic powder is used, expressed per 100 mass parts of the binder resin or polymerizable monomer that produces the binder resin, at least 20 mass parts and not more than 200 mass parts is preferred and at least 40 mass parts and not more than 150 mass parts is more preferred.

The number-average particle diameter of the magnetic powder is preferably at least 0.10 μm and not more than 0.40 μm since generally a smaller particle diameter for the magnetic powder raises the tinting strength although also facilitating aggregation of the magnetic powder.

The number-average particle diameter of the magnetic powder can be measured using a scanning transmission electron microscope. Specifically, the toner particles to be observed are thoroughly dispersed in an epoxy resin followed by curing for 2 days in an atmosphere with a temperature of 40° C. to obtain a cured material. A thin-section sample is prepared from this cured material using a microtome, and the diameters of 100 magnetic powder particles are measured in the field of observation of a 10,000× to 40,000× photograph using a scanning transmission electron microscope (STEM). The number-average particle diameter is calculated based on the circle-equivalent diameter of the projected area of the magnetic powder. The particle diameter can also be measured with an image analyzer.

The magnetic powder used in the toner of the present invention can be produced, for example, by the following method. An alkali, e.g., sodium hydroxide, is added—in an equivalent amount or more than an equivalent amount with reference to the iron component—to an aqueous solution of a ferrous salt to prepare an aqueous solution containing ferrous hydroxide. Air is blown in while keeping the pH of the prepared aqueous solution at 7 or above, and an oxidation reaction is carried out on the ferrous hydroxide while heating the aqueous solution to at least 70° C. to first produce seed crystals that will form the core for the magnetic iron oxide powder.

An aqueous solution containing ferrous sulfate is added, in an amount that is approximately 1 equivalent based on the amount of addition of the previously added alkali, to the seed crystal-containing slurry. While maintaining the pH of the solution at 5 to 10 and blowing in air, the reaction of the ferrous hydroxide is developed in order to grow a magnetic iron oxide powder using the seed crystal as cores. At this point, the shape and magnetic properties of the magnetic powder can be controlled by free selection of the pH, reaction temperature, and stirring conditions. The pH of the solution transitions to the acidic side as the oxidation reaction progresses, but the pH of the solution preferably does not drop below 5. The magnetic body obtained proceeding in this manner is filtered, washed, and dried by standard methods to obtain the magnetic powder.

Moreover, when the toner is produced in an aqueous medium, a hydrophobic treatment of the magnetic powder surface is strongly preferred. When this surface treatment is carried out by a dry method, treatment with a coupling agent is carried out on the washed, filtered, and dried magnetic powder. When this surface treatment is carried out by a wet method, the coupling treatment is carried out with redispersion of the dried material after the completion of the oxidation reaction, or with redispersion, in a separate aqueous medium without drying, of the iron oxide obtained by washing and filtration after the completion of the oxidation reaction. Either a dry method or a wet method may be selected as appropriate in the present invention.

The coupling agents that can be used for surface treatment of the magnetic powder can be exemplified by silane coupling agents and titanium coupling agents. The use is more preferred of a silane coupling agent, as given by general formula (I).

$$R_mSiY_n \qquad (I)$$

[In the formula, R represents an alkoxy group; m represents an integer from 1 to 3; Y represents a functional group, e.g., alkyl group, phenyl group, vinyl group, epoxy group, (meth)acryl group; and n represents an integer from 1 to 3; with the proviso that m+n=4.]

The silane coupling agents given by general formula (I) can be exemplified by vinyltrimethoxysilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-glycidoxypropylmethyldiethoxysilane, γ-aminopropyltriethoxysilane, N-phenyl-γ-aminopropyltrimethoxysilane, γ-methacryloxypropyltrimethoxysilane, vinyltriacetoxysilane, methyltrimethoxysilane, dimethyldimethoxysilane, phenyltrimethoxysilane, diphenyldimethoxysilane, methyltriethoxysilane, dimethyldiethoxysilane, phenyltriethoxysilane, diphenyldiethoxysilane, n-propyltrimethoxysilane, isopropyltrimethoxysilane, n-butyltrimethoxysilane, isobutyltrimethoxysilane, trimethylmethoxysilane, n-hexyltrimethoxysilane, n-octyltrimethoxysilane, n-octyltriethoxysilane, n-decyltrimethoxysilane, hydroxypropyltrimethoxysilane, n-hexadecyltrimethoxysilane, and n-octadecyltrimethoxysilane. The use is preferred in the present invention of a compound in which Y in general formula (I) is an alkyl group. An alkyl group having at least 3 and not more than 6 carbons is preferred in this regard and an alkyl group having 3 or 4 carbons is particularly preferred.

In the case of use of a silane coupling agent, treatment may be carried out with a single one or may be carried out using a plurality of species in combination. When the combination of a plurality of species is used, a separate treatment may be performed with each individual coupling agent or a simultaneous treatment may be carried out.

The total treatment amount for the coupling agent used is preferably 0.9 mass parts to 3.0 mass parts per 100 mass parts of the magnetic powder, and it is important to adjust the amount of the treatment agent in conformity with the surface area of the magnetic powder, the reactivity of the coupling agent, and so forth.

A charge control agent may be used in the toner of the present invention in order to maintain a stable charging performance for the toner regardless of the environment.

Negative-charging charge control agents can be exemplified by the following: monoazo metal compounds; acetylacetone metal compounds; metal compounds of aromatic oxycarboxylic acids, aromatic dicarboxylic acids, oxycarboxylic acids, and dicarboxylic acids; aromatic oxycarboxylic acids and aromatic mono- and polycarboxylic acids and their metal salts, anhydrides, and esters; phenol derivatives such as bisphenol; urea derivatives; metal-containing salicylic acid-type compounds; metal-containing naphthoic acid-type compounds; boron compounds; quaternary ammonium salts; calixarene; and resin-type charge control agents.

The positive-charging charge control agents can be exemplified by the following: nigrosine and nigrosine modifications by, for example, a fatty acid metal salt; guanidine compounds; imidazole compounds; quaternary ammonium salts such as tributylbenzylammonium 1-hydroxy-4-naphthosulfonate salt and tetrabutylammonium tetrafluoroborate, and the onium salts, such as phosphonium salts, that are analogues of the preceding, and their lake pigments; triphenylmethane dyes and their lake pigments (the laking agent can be exemplified by phosphotungstic acid, phosphomolybdic acid, phosphotungstomolybdic acid, tannic acid, lauric acid, gallic acid, ferricyanide, and ferrocyanide); metal salts of higher fatty acids; diorganotin oxides such as dibutyltin oxide, dioctyltin oxide, and dicyclohexyltin oxide; diorganotin borates such as dibutyltin borate, dioctyltin borate, and dicyclohexyltin borate; and resin-type charge control agents. A single one of the preceding may be used or combinations of two or more may be used. The blending amount for the charge control agent, per 100 mass parts of the polymerizable monomer, is preferably at least 0.01 mass parts and not more than 20.0 mass parts and more preferably at least 0.05 mass parts and not more than 10.0 mass parts.

The weight-average particle diameter (D4) of the toner of the present invention is preferably at least 4.0 μm and not more than 11.0 μm and more preferably at least 5.0 μm and not more than 10.0 μm. A particularly good flowability is obtained when the weight-average particle diameter (D4) is at least 4.0 μm and not more than 11.0 μm and faithful development into the latent image can be achieved.

The toner of the present invention can be produced by any known method.

First, in the case of production by a pulverization method, for example, the binder resin and colorant and optional other additives such as release agent, charge control agent, and so forth are thoroughly mixed using a mixer such as a Henschel mixer or ball mill. This is followed by melt-kneading using a heated kneader, such as a hot roll, kneader, or extruder, to disperse or melt the toner materials. Toner base particles can then be obtained by cooling and solidification and pulverization followed as necessary by the execution of classification and a surface treatment. With regard to the sequence for classification and surface treatment, either may come first. Viewed in terms of production efficiency, the classification step preferably uses a multi-grade classifier.

The pulverization step can be carried out by a method that uses a known pulverizing apparatus, e.g., a mechanical impact system, a jet system, and so forth. In addition, pulverization is preferably carried out with the additional application of heat and/or with the execution of a process that applies mechanical impact on an auxiliary basis. In addition, for example, a bath method in which the finely pulverized (and optionally classified) particles are dispersed in hot water, a method in which the finely pulverized (and optionally classified) particles are passed through a hot air current, and so forth, may be used.

The means for applying a mechanical impact force can be exemplified by methods using a mechanical impact-type pulverizer, e.g., a Kryptron System from Kawasaki Heavy Industries, Ltd. or a Turbo Mill from Turbo Kogyo Co., Ltd. Also usable are apparatuses such as the Mechanofusion System from Hosokawa Micron Corporation and the Hybridization System from Nara Machinery Co., Ltd. These apparatuses are methods in which the particles are pressed by centrifugal force, by impellers rotating at high speeds, to the inside of a casing and mechanical impact force is applied to the particles by forces such as compressive force, frictional force, and so forth.

The toner of the present invention may be produced by pulverization methods as described above, but the toner base particles are preferably produced in an aqueous medium from the standpoint of control of the state of occurrence of the crystalline materials, e.g., the crystalline polyester, release agent, and so forth. In particular, the suspension polymerization method is preferred because it supports bringing the crystalline polyester into a microdispersed state and facilitates control of the promotion of crystallization.

The suspension polymerization method is described in the following.

In the suspension polymerization method, the polymerizable monomer and colorant (and optionally a polymerization initiator, crosslinking agent, charge control agent, and other additives) are dissolved or dispersed to uniformity to obtain a polymerizable monomer composition. Then, this polymerizable monomer composition is dispersed using a suitable stirring device in a continuous phase (for example, an aqueous phase) that contains a dispersing agent while a polymerization reaction is run at the same time, to thereby obtain a toner having a desired particle diameter. The toner obtained by this suspension polymerization method (also referred to hereafter as "polymerized toner") can be expected to provide an enhanced image quality because the shape of the individual toner particles is uniformly approximately spherical and the distribution of the amount of charge is also relatively uniform.

The polymerization initiator used in the production of the toner of the present invention by a polymerization method is preferably a polymerization initiator that has a half-life in the polymerization reaction of at least 0.5 hours and not more than 30 hours. In addition, when the polymerization reaction is run using an amount of addition that is at least 0.5 mass parts and not more than 20 mass parts per 100 mass parts of the polymerizable monomer, a polymer can be obtained that has a molecular weight maximum between 5,000 and 50,000 and a preferred strength and favorable melt properties can then be imparted to the toner.

Specific polymerization initiators can be exemplified by the following: azo and diazo polymerization initiators such as 2,2'-azobis(2,4-dimethylvaleronitrile), 2,2'-azobisisobutyronitrile, 1,1'-azobis(cyclohexane-1-carbonitrile), 2,2'-azobis-4-methoxy-2, 4-dimethylvaleronitrile, and azobisisobutyronitrile, and peroxide polymerization initiators such as benzoyl peroxide, methyl ethyl ketone peroxide, diisopropyl peroxycarbonate, cumene hydroperoxide, 2,4-dichlorobenzoyl peroxide, lauroyl peroxide, t-butyl peroxy-2-ethylhexanoate, and t-butyl peroxypivalate.

A crosslinking agent may be added when the toner of the present invention is produced by a polymerization method, and a preferred amount of addition for this is at least 0.001 mass parts and not more than 15 mass parts per 100 mass parts of the polymerizable monomer. A high elasticity preferred for the toner of the present invention can be obtained by having the amount of crosslinking agent addition be in the indicated range.

Primarily compounds having at least two polymerizable double bonds are used as the crosslinking agent used in the present invention. For example, an aromatic divinyl compound such as divinylbenzene or divinylnaphthalene; a carboxylate ester having two double bonds such as, for example, ethylene glycol diacrylate, ethylene glycol dimethacrylate, 1,3-butanediol dimethacrylate, triethylene glycol diacrylate, tetraethylene glycol diacrylate, polyethylene glycol diacrylate, 1,4-butanediol diacrylate, 1,5-pentanediol diacrylate, 1,6-hexanediol diacrylate, 1,7-heptanediol diacrylate, 1,8-octanediol diacrylate, 1,9-nonanediol diacrylate, 1,10-decanediol diacrylate, 1,11-undecanediol diacrylate, 1,18-octadecanediol diacrylate, neopentyl glycol diacrylate, tripropylene glycol diacrylate, or polypropylene glycol diacrylate; a divinyl compound such as divinylaniline, divinyl ether, divinyl sulfide, or divinyl sulfone; or a compound having three or more vinyl groups may be used, either individually or as a mixture of two or more species.

The use is preferred in particular of the 1,4-butanediol diacrylate, 1,5-pentanediol diacrylate, 1,6-hexanediol diacrylate, 1,7-heptanediol diacrylate, 1,8-octanediol diacrylate, 1,9-nonanediol diacrylate, 1,10-decanediol diacrylate, 1,11-undecanediol diacrylate, and 1,18-octadecanediol diacrylate given by the following formula.

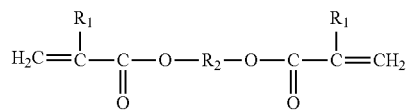

[In the formula, $R_1$ represents a hydrogen atom or an alkyl group having 1 to 3 carbons and $R_2$ represents a linear alkylene group having 4 to 18 carbons.]

These compounds facilitate the formation of a large network structure because they are flexible and, due to their relatively long molecular chains, readily widen the distance between crosslink points in the binder resin.

As a result, coexistence with the back end offset is readily brought about in the present invention while controlling G' (Te).

The reasons here are not certain, but it is hypothesized that the presence of the crosslinked structure facilitates control of the viscoelastic behavior of the toner while at the same time, due to the wide distance between the crosslink points, deformation of the resin during fixing is then easily promoted and the ability of the crosslink structure to inhibit the fixing performance is restrained.

In methods of producing the toner of the present invention by polymerization, generally a toner composition as described above and so forth is added as appropriate and is dissolved or dispersed to uniformity using a disperser, e.g., a homogenizer, ball mill, or ultrasound disperser, to give a polymerizable monomer composition and this polymerizable monomer composition is suspended in an aqueous medium that contains a dispersing agent. At this point, the particle diameter distribution of the obtained toner particles is sharpened by establishing the desired toner particle size all at once using a high-speed disperser such as a high-speed stirrer or an ultrasound disperser. With regard to the time point for addition of the polymerization initiator, it may be added at the same time as the addition of the other additives to the polymerizable monomer or it may be mixed immediately before suspension in the aqueous medium. In addition, the polymerization initiator dissolved in the polymerizable monomer or solvent may also be added immediately after granulation and prior to the initiation of the polymerization reaction.

After granulation, stirring should be carried out, using an ordinary stirrer, to a degree that maintains the particulate condition and prevents particle flotation or sedimentation.

A known surfactant or organic dispersing agent or inorganic dispersing agent can be used as a dispersing agent in the production of the toner of the present invention. Among these, the use of inorganic dispersing agents is preferred because they resist the production of toxic ultrafine dust; they achieve dispersion stability through steric hindrance and because of this resist disruptions in the stability even when changes in the reaction temperature occur; and they are easily washed out and thus tend to avoid having negative effects on the toner. These inorganic dispersing agents can be exemplified by multivalent metal salts of phosphoric acid, such as tricalcium phosphate, magnesium phosphate, aluminum phosphate, zinc phosphate, and hydroxyapatite; carbonates such as calcium carbonate and magnesium carbonate; inorganic salts such as calcium metasilicate, calcium sulfate, and barium sulfate; and inorganic compounds such as calcium hydroxide, magnesium hydroxide, and aluminum hydroxide.

These inorganic dispersing agents are preferably used at least 0.2 mass parts and not more than 20 mass parts per 100 mass parts of the polymerizable monomer. In addition, a single one of these dispersing agents may be used by itself or a plurality may be used in combination. At least 0.001 mass parts and not more than 0.1 mass parts of a surfactant may also be co-used.

When these inorganic dispersing agents are used, they may be used as such or, in order to obtain even finer particles, they may be used by producing particles of the inorganic dispersing agent in the aqueous medium. For example, in the case of calcium phosphate, water-insoluble calcium phosphate can be produced by mixing an aqueous sodium phosphate solution with an aqueous calcium chloride solution under high-speed stirring, and a more uniform fine dispersion is then made possible. Here, water-soluble sodium chloride is produced as a by-product at the same time, but the presence of the water-soluble salt in the aqueous medium is even more favorable because this inhibits the dissolution of the polymerizable monomer in the water and suppresses the production of ultrafine toner particles by emulsion polymerization.

The surfactant can be exemplified by sodium dodecylbenzene sulfate, sodium tetradecyl sulfate, sodium pentadecyl sulfate, sodium octyl sulfate, sodium oleate, sodium laurate, sodium stearate, and potassium stearate.

The polymerization temperature in the step of polymerizing the polymerizable monomer is set to preferably at least 40° C. and more preferably to a temperature of at least 50° C. and not more than 90° C. When the polymerization is carried out in this temperature range and when a release agent has been used, the release agent which is to be sealed in the interior undergoes precipitation through phase separation and its encapsulation is thus facilitated.

Once the polymerization of the polymerizable monomer has been completed and colored particles have been obtained, the colored particles are preferably heated, while dispersed in the aqueous medium, to a temperature that exceeds the melting points of the crystalline polyester and release agent that have been added as necessary. This process is not necessary when the polymerization temperature exceeds these melting points.

The range preferred for the present invention for the ensuing cooling rate will be considered for toner production methods as a whole and not just for polymerization methods.

For the case of use of crystalline materials such as the crystalline polyester, release agent, and so forth, the focus is on toner production methods with the objective of bringing about the crystallization of the crystalline materials and particularly the crystalline polyester.

For toner production by, for example, the pulverization method, suspension polymerization, or emulsion polymerization, a step is frequently included in which heating is performed to a temperature at which the crystalline polyester and release agent temporarily melt followed by cooling to normal temperature.

Considering the cooling step, as the temperature declines, molecular motion in the crystalline materials, which have been liquefied by the increase in temperature, becomes less active and crystallization begins when the neighborhood of the crystallization temperature is reached. Crystallization progresses with additional cooling and complete solidification occurs at normal temperature. Investigations by the present inventors demonstrated that the degree of crystallinity of the crystalline material varied with the cooling rate.

Specifically, an increasing trend for the degree of crystallinity of the contained crystalline material occurred when cooling was carried out at a fast rate from a temperature high enough for the crystalline polyester and release agent to melt (for example, 100° C.), to the vicinity of the crystallization temperature of the crystalline material. In addition, control into the preferred ranges of the present invention for the aforementioned small domains is facilitated by a sufficiently rapid cooling rate.

When, conversely, the cooling rate is slow, the degree of crystallinity of the crystalline polyester and release agent readily decline in the period of gradual cooling and compatibilization into the binder resin readily occurs.

In this case, a trend occurs whereby formation of small domains of the crystalline material is impeded.

As a result, the binder resin readily undergoes softening and the generation of fogging after heat-cycling storage is facilitated and in addition the generation of cold offset may also occur.

More specifically, the condition of a sufficiently rapid cooling rate preferably is the case of cooling at a rate sufficiently faster than at least 50.0° C./minute and, in the particular case where the goal is to induce crystallization of the crystalline polyester, at least 100.0° C./minute is preferred and at least 150.0° C./minute is more preferred. Conversely, the condition of a sufficiently slow cooling rate is the case of cooling at a rate sufficiently slower than 10.0° C./minute, for example, at least 0.5° C./minute and not more than 5.0° C./minute or a cooling rate lower than this.

The execution of an annealing treatment at a temperature in the vicinity of the crystallization temperature of the crystalline material (specifically, the range of the crystallization temperature ±5° C.) is preferably also carried out from the standpoint of increasing the degree of crystallinity of the crystalline material. The preferred range for the holding time is at least 30 minutes, more preferably at least 60 minutes, and even more preferably at least 100 minutes. The upper limit for this holding period is approximately equal to or less than 24 hours in view of the relationship with the production efficiency.

The degree of crystallinity of the crystalline material is readily increased by holding for a long period of time, and this is thus preferred. On the other hand, when the holding time is short (for example, less than 30 minutes), the degree of crystallinity of the crystalline material may not be adequately raised.

The toner base particles are obtained by subjecting the obtained polymer particles to filtration, washing, and drying by known methods. An inorganic fine powder as described below may as necessary be mixed with these toner base particles to attach same to the toner base particle surface. The course powder and fines present in the toner base particles can also be fractionated off by the introduction into the production process of a classification step (prior to mixing with the inorganic fine powder).

The toner may also be made as necessary by mixing, for example, a fluidizing agent and so forth, with the toner base particles obtained by the production method as described above. A known procedure can be used for the mixing method; for example, the Mitsui Henschel mixer (Mitsui Miike Chemical Engineering Machinery Co., Ltd.) is an apparatus that can be advantageously used.

In a preferred embodiment for the toner of the present invention, an inorganic fine powder having a number-average primary particle diameter of preferably at least 4 nm and not more than 80 nm and more preferably at least 6 nm and not more than 40 nm is added to the toner base particles as a fluidizing agent. The inorganic fine powder is added in order to improve toner flowability and establish charge uniformity for the toner; however, in a preferred embodiment functions such as adjusting the amount of charge on the toner and improving the environmental stability are also imparted by a treatment such as carrying out a hydrophobic treatment on the inorganic fine powder. The number-average primary particle diameter of the inorganic fine powder can be measured by a method that uses a magnified photograph of the toner taken with a scanning electron microscope.

For example, silica, titanium oxide, alumina, and so forth can be used for the inorganic fine powder. For example, a so-called dry silica or fumed silica produced by the vapor-phase oxidation of a silicon halide and a so-called wet silica produced from, e.g., water glass, can both be used as the silica fine powder. However, dry silica—which presents little silanol group at the surface or in the interior of the silica fine powder and which contains little residue from production, e.g., $Na_2O$, $SO_3^{2-}$, etc.—is preferred. For example, by using another metal halide compound, e.g., aluminum chloride or titanium chloride, in the production process along with the silicon halide compound, it is also possible to obtain a composite fine powder of silica and another metal oxide, and these composite fine powders are also encompassed by the dry silica.

The amount of addition of the inorganic fine powder is preferably at least 0.1 mass parts and not more than 3.0 mass parts per 100 mass parts of the toner base particles. When the amount of addition is at least 0.1 mass parts, the effects therefrom are satisfactorily obtained; the fixing performance is excellent at not more than 3.0 mass parts. The content of the inorganic fine powder can be quantitated using x-ray fluorescence analysis using a calibration curve constructed from standard samples.

The inorganic fine powder is preferably a hydrophobically treated substance in the present invention because this can bring about an improvement in the environmental stability of the toner. When the inorganic fine powder absorbs moisture, the amount of charge on the toner undergoes a substantial decline and the amount of charge readily becomes nonuniform and toner scattering readily occurs. A single treatment agent, e.g., silicone varnish, various modified silicone varnishes, silicone oil, various modified silicone oils, silane compounds, silane coupling agents, other organosilicon compounds, organotitanium compounds, and so forth, or combinations of two or more may be used as the treatment agent used in the hydrophobic treatment of the inorganic fine powder.

Other additives may also be used in the toner of the present invention in small amounts within a range that substantially does not exercise a negative effect, for example, lubricant powders such as a fluororesin powder, zinc stearate powder, polyvinylidene fluoride powder, and so forth; abrasives such as cerium oxide powder, silicon carbide powder, strontium titanate powder, and so forth; flowability-imparting agents such as, for example, titanium oxide powder, aluminum oxide powder, and so forth; anti-caking agents; and a reverse-polarity organic fine powder or inorganic fine powder as a development performance improving agent. These additives may also be used after carrying out a surface hydrophobic treatment thereon.

The methods used to measure the various properties pertaining to the production of the toner of the present invention are described in the following.

<Method for Measuring the Powder Dynamic Viscoelasticity of the Toner>

The measurement is performed using a DMA 8000 (PerkinElmer, Inc.) dynamic viscoelastic analyzer. measurement tool: material pocket (P/N: N533-0322)

80 mg of the toner is sandwiched in the material pocket and this is installed in the single cantilever and fixed by tightening the bolts with a torque wrench.

The measurement uses the "DMA Control Software" (PerkinElmer, Inc.) dedicated software. The measurement is performed using the following conditions.
oven: Standard Air Oven
measurement type: temperature scan
DMA condition: single frequency/strain (G)
frequency: 1 Hz
strain: 0.05 mm
starting temperature: 25° C.
end temperature: 180° C.
scanning rate: 20° C./minute
deformation mode: single cantilever (B)
cross section: rectangle (R)
sample size (length): 17.5 mm
sample size (width): 7.5 mm
sample size (thickness): 1.5 mm The onset temperature Te (° C.) is determined from the storage elastic modulus E' curve yielded by the measurement. Te is the temperature at the intersection between the straight line provided by extension to the high temperature side of the E' curve baseline on the low temperature side and the tangent drawn at the point where the slope of the E' curve assumes a maximum.

<Method for Measuring the Pellet Dynamic Viscoelasticity of the Toner>

The measurement is carried out using an ARES (Rheometric Scientific, Inc.) dynamic viscoelastic analyzer (rheometer).
measurement tool: Serrated parallel plates with a diameter of 7.9 mm are used.
measurement sample: The toner is molded (15 kN is maintained for 1 minute at normal temperature) into a pellet (cylindrical sample) with a diameter of approximately 8 mm and a height of approximately 2 mm using a compression molder. An NT-100H 100 kN-press from NPa System Co., Ltd. is used as the compression molder.

The temperature of the serrated parallel plates is adjusted to 120° C.; the cylindrical sample is heated and melted and the serrated teeth are inserted; and fixing on the serrated parallel plates is brought about by the application of a load in the perpendicular direction such that the axial force does not exceed 30 (gf). At this point, a steel belt may be used to make the diameter of the sample the same as the diameter of the parallel plates. The serrated parallel plates and the cylindrical sample are cooled over 1 hour to the measurement start temperature of 30.00° C.
measurement frequency: 6.28 radian/second
measurement strain setting: The measurement is run in automatic measurement mode with the initial value set to 0.1%.
sample extension correction: Adjustment by automatic measurement mode.
measurement temperature: The temperature is raised from 30° C. to 150° C. at a rate of 2° C. per minute.
measurement interval: The viscoelastic data is measured every 30 seconds, i.e., every 1° C.

<Method for Measuring the Weight-Average Particle Diameter (D4) of the Toner>

The weight-average particle diameter (D4) of the toner is determined as follows (the same determination is used for toner particles). The measurement instrument used is a "Coulter Counter Multisizer 3" (registered trademark, Beckman Coulter, Inc.), a precision particle size distribution measurement instrument operating on the pore electrical resistance method and equipped with a 100 μm aperture tube. The measurement conditions are set and the measurement data are analyzed using the accompanying dedicated software, i.e., "Beckman Coulter Multisizer 3 Version 3.51" (Beckman Coulter, Inc.). The measurements are carried out in 25,000 channels for the number of effective measurement channels.

The aqueous electrolyte solution used for the measurements is prepared by dissolving special-grade sodium chloride in deionized water to provide a concentration of approximately 1 mass % and, for example, "Isoton II" (Beckman Coulter, Inc.) can be used.

The dedicated software is configured as follows prior to measurement and analysis.

In the "modify the standard operating method (SOM)" screen in the dedicated software, the total count number in the control mode is set to 50,000 particles; the number of measurements is set to 1 time; and the Kd value is set to the value obtained using "standard particle 10.0 μm" (Beckman Coulter, Inc.). The threshold value and noise level are automatically set by pressing the "threshold value/noise level measurement button". In addition, the current is set to 1600 μA; the gain is set to 2; the electrolyte is set to Isoton II; and a check is entered for the "post-measurement aperture tube flush".

In the "setting conversion from pulses to particle diameter" screen of the dedicated software, the bin interval is set to logarithmic particle diameter; the particle diameter bin is set to 256 particle diameter bins; and the particle diameter range is set to 2 μm to 60 μm.

The specific measurement procedure is as follows.

(1) Approximately 200 mL of the above-described aqueous electrolyte solution is introduced into a 250-mL roundbottom glass beaker intended for use with the Multisizer 3 and this is placed in the sample stand and counterclockwise stirring with the stirrer rod is carried out at 24 rotations per second. Contamination and air bubbles within the aperture tube are preliminarily removed by the "aperture flush" function of the dedicated software.

(2) Approximately 30 mL of the above-described aqueous electrolyte solution is introduced into a 100-mL flatbottom glass beaker. To this is added as dispersing agent approximately 0.3 mL of a dilution prepared by the approximately three-fold (mass) dilution with deionized water of "Contaminon N" (a 10 mass % aqueous solution of a neutral pH 7 detergent for cleaning precision measurement instrumentation, made of a nonionic surfactant, anionic surfactant, and organic builder, from Wako Pure Chemical Industries, Ltd.).

(3) An "Ultrasonic Dispersion System Tetora 150" (Nikkaki Bios Co., Ltd.) is prepared; this is an ultrasound disperser with an electrical output of 120 W and is equipped with two oscillators (oscillation frequency=50 kHz) disposed such that the phases are displaced by 180°. Approximately 3.3 L of deionized water is introduced into the water tank of this ultrasound disperser and approximately 2 mL of Contaminon N is added to this water tank.

(4) The beaker described in (2) is set into the beaker holder opening on the ultrasound disperser and the ultrasound disperser is started. The vertical position of the beaker is adjusted in such a manner that the resonance condition of the surface of the aqueous electrolyte solution within the beaker is at a maximum.

(5) While the aqueous electrolyte solution within the beaker set up according to (4) is being irradiated with ultrasound, approximately 10 mg of the toner is added to the aqueous electrolyte solution in small aliquots and dispersion is carried out. The ultrasound dispersion treatment is continued for an additional 60 seconds. The water temperature in the water tank is controlled as appropriate during ultrasound dispersion to be at least 10° C. and not more than 40° C.

(6) Using a pipette, the dispersed toner-containing aqueous electrolyte solution prepared in (5) is dripped into the roundbottom beaker set in the sample stand as described in (1) with adjustment to provide a measurement concentration of approximately 5%. Measurement is then performed until the number of measured particles reaches 50,000.

(7) The measurement data is analyzed by the previously cited dedicated software provided with the instrument and the weight-average particle diameter (D4) is calculated. When set to graph/volume % with the dedicated software, the "average diameter" on the "analysis/volumetric statistical value (arithmetic average)" screen is the weight-average particle diameter (D4).

<Method for Observing the Toner Particle Cross Section with a Scanning Transmission Electron Microscope (STEM)>

Observation of the toner particle cross section with a scanning transmission electron microscope (STEM) can be carried out as follows.

Observation of the toner particle cross section is carried out using ruthenium staining of the toner particle cross section. Crystalline material is more resistant to staining with ruthenium than is amorphous resin and thus assumes a clear contrast and is then easily observed.

First, the toner is dispersed onto a cover glass (Matsunami Glass Ind., Ltd., Square Cover Glass No. 1) so as to provide a single layer, and an Os film (5 nm) and a naphthalene film (20 nm) are formed as protective films using an osmium plasma coater (OPC80T, Filgen, Inc.). Then, D800 photocurable resin (JEOL Ltd.) is filled into a PTFE tube (1.5 mmØ×3 mmØ×3 mm) and the cover glass is gently placed over the tube oriented so the toner is in contact with the D800 photocurable resin. Exposure to light is carried out while in this configuration and the resin is cured, after which the cover glass and the tube are removed to form a cylindrical resin having the toner embedded in the surface portion. Using an ultrasound ultramicrotome (UC7, Leica Microsystems), toner particle cross sections are produced by slicing just the length of the toner particle radius (4.0 μm when the weight-average particle diameter (D4) is 8.0 μm) from the surfacemost position of the cylindrical resin at a slicing rate of 0.6 mm/second. Thin-slice samples of toner particle cross sections are then produced by slicing so as to provide a film thickness of 250 nm in the case of magnetic toners and a film thickness of 70 nm in the case of nonmagnetic toners. Cross sections of the central region of the toner particle can be obtained by executing slicing using this procedure.

The obtained thin-slice samples were stained for 15 minutes in a 500 Pa $RuO_4$ gas atmosphere using a vacuum electronic staining device (VSC4R1H, Filgen, Inc.), and STEM observation was carried out using the STEM function of a TEM (JEM2800, JEOL Ltd.).

Image acquisition was performed using an STEM probe size of 1 nm and an image size of 1,024×1,024 pixels. The images were acquired with adjustment of the Contrast to 1425 and the Brightness to 3750 on the Detector Control panel for the bright field image and adjustment of the Contrast to 0.0, the Brightness to 0.5, and the Gamma to 1.00 on the Image Control panel.

<Identification of Crystalline Material Domains>

Identification of the domains of the crystalline material was carried out according to the following procedure based on STEM images of the toner particle cross section.

When the crystalline materials can be acquired as raw materials, their crystal structures are observed proceeding in the same manner as for the previously described method of observing the ruthenium-stained toner particle cross section with a scanning transmission electron microscope (STEM) and images of the crystal lamellar structure are obtained for each starting material. These are compared with the lamellar structure of the domains in the toner particle cross section, and the raw material forming the domains in the toner particle cross section can be identified when the difference in the layer spacing of the lamellae is not more than 10%.

<Identification of the Crystalline Materials>

The release agent has a low molecular weight and the molecular weight of the crystalline polyester is higher than that of the release agent. This is used to separate the release agent and crystalline polyester from the toner.

Specifically, 100 mg of the toner is dissolved in 3 mL of chloroform. The insoluble matter is then separated by suction filtration with a syringe fitted with a sample treatment filter (using, e.g., a pore size of at least 0.2 µm and not more than 0.5 µm, for example, a Sample Pretreatment Cartridge H-25-2 (Tosoh Corporation)). The soluble matter is introduced onto a preparative HPLC (instrument: LC-9130 NEXT, Japan Analytical Industry Co., Ltd., [60 cm] preparative column, exclusion limits: 20,000, 70,000, 2-column train) and a chloroform elution solution is pumped through. Once peaks can be identified on the resulting chromatograph display, fractionation is carried out into before and after the retention time corresponding to a molecular weight of 5,000 as provided by a monodisperse polystyrene standard sample.

The solvent is removed from the fractionated solutions using an evaporator and vacuum drying is then carried out for 24 hours to obtain a sample with a molecular weight of less than 5,000 (X component) and a sample with a molecular weight of at least 5,000 (Y component). The masses of X and Y are recorded.

Then, using a JPS-700 pyrolyzer (Japan Analytical Industry Co., Ltd.), the X component is heated to 590° C. in the presence of tetramethylammonium hydroxide (TMAH) to carry out pyrolysis while executing methylation.

The total area for each of the alcohol component and carboxylic acid component originating from the release agent is subsequently determined by GC-MASS (ISQ Focus GC, HP-5MS [30 m], Thermo Fisher Scientific Inc.).

The composition of the release agent can be obtained by calculating the area ratios for the individual peaks.

The composition of the crystalline polyester can be similarly obtained by analysis and examination of the Y component.

<Measurement of the Long Diameter of the Crystalline Material Domains>

For the long diameter of the crystalline material domains, a measurement method was adopted in the present invention that provided the longest when the domain had an irregular shape and this was used as the long diameter of the domain.

The long diameter of the crystalline material domains is measured based on the TEM image obtained by observation of the ruthenium-stained toner particle cross section with a scanning transmission electron microscope (STEM). At least 100 toner particle cross sections are observed here. The observed toner particles are those that have a long diameter R (µm) that satisfies the relationship $0.9 \le R/D4 \le 1.1$ with respect to the weight-average particle diameter (D4) of the toner.

<Measurement of the Number of Crystalline Material Domains>

The number of crystalline material domains contained per toner particle cross section is measured in the same manner as for the aforementioned measurement of the long diameter of the crystalline material domains. This was carried out on at least 100 toner particle cross sections and the number of domains per one toner particle cross section is used for the number of crystalline material domains.

Specifically, the number of small domains having a long diameter of 50 nm to 500 nm is measured among the crystalline material domains and the arithmetic average value is calculated for 100 toner particle cross sections.

<Measurement of the Percentage for the Area of the Crystalline Material Large Domains with Respect to the Area of the Toner Particle Cross Section>

For the percentage for the area of the crystalline material large domains with respect to the area of the toner particle cross section, the image (bright field image) obtained by the aforementioned STEM observation is binarized using "Image J 1.48" image processing software.

First, binarization is carried out with the threshold value for the brightness (255 gradations) set to enable discrimination of the crystalline material large domains and the area of the large domains is determined. The area of the toner particle cross section having these large domains is also determined, and the percentage for the area taken up by the crystalline material large domains in the toner particle cross section is determined.

In the present invention, binarization and conversion into numerical values were carried out on at least 100 toner particles that satisfied the relationship $0.9 \le R/D4 \le 1.1$ and the arithmetic average value thereof was used as the area percentage.

<Identification of the Terminal Structure in the Crystalline Polyester>

2 mg of the resin sample is exactly weighed out, 2 mL of chloroform is added, and dissolution is carried out to produce a sample solution. While the crystalline polyester is used as the resin sample, the toner containing the crystalline polyester may also be used instead for the sample. 20 mg of 2,5-dihydroxybenzoic acid (DHBA) is then exactly weighed out, 1 mL of chloroform is added, and dissolution is carried out to prepare a matrix solution. In addition, 3 mg of sodium trifluoroacetate (NaTFA) is also exactly weighed out, 1 mL of acetone is added, and dissolution is carried out to prepare an ionization assistant solution.

The measurement sample is made by mixing 25 µL of the thusly prepared sample solution, 50 µL of the thusly prepared matrix solution, and 5 µL of the thusly prepared ionization assistant solution, dripping this onto a sample plate for MALDI analysis, and drying. The mass spectrum is obtained using a MALDI-TOF MS (Reflex III, Bruker Daltonics) as the analytical instrumentation. The individual peaks in the oligomer region ($m/Z \le 2,000$) in the obtained mass spectrum are assigned and the determination is made of the presence/absence of a peak corresponding to a structure in which monocarboxylic acid is bonded at the molecular terminal.

<Method for Measuring the Molecular Weight of the Crystalline Polyester>

The molecular weight of the crystalline polyester is measured using gel permeation chromatography (GPC) as follows.

First, the crystalline polyester is dissolved in tetrahydrofuran (THF) at room temperature. The obtained solution is filtered with a "Sample Pretreatment Cartridge" (Tosoh Corporation) solvent-resistant membrane filter having a pore diameter of 0.2 µm to obtain a sample solution. The sample solution is adjusted to a concentration of THF-soluble component of 0.8 mass %. Measurement is carried out under the following conditions using this sample solution.

instrument: "HLC-8220GPC" high-performance GPC instrument [Tosoh Corporation]
column: 2×LF-604
eluent: THF
flow rate: 0.6 mL/minute
oven temperature: 40° C.
sample injection amount: 0.020 mL A molecular weight calibration curve constructed using polystyrene resin standards (for example, product name "TSK Standard Polystyrene F-850, F-450, F-288, F-128, F-80, F-40, F-20, F-10, F-4, F-2, F-1, A-5000, A-2500, A-1000, A-500", Tosoh Corporation) is used to determine the molecular weight of the sample.

<Method for Measuring the Hydroxyl Value of the Crystalline Polyester>

The hydroxyl value OHv (JIS hydroxyl value) of the crystalline polyester is determined in the present invention using the method described in the following. The hydroxyl value is the number of milligrams of potassium hydroxide required to neutralize the acetic acid bonded with the hydroxyl group when 1 g of the sample is acetylated. The hydroxyl value of the crystalline polyester is measured based on JIS K 0070-1992.

The measurement is specifically carried out using the following procedure.

(1) Reagent Preparation 25 g of special-grade acetic anhydride is introduced into a 100-mL volumetric flask; the total volume is brought to 100 mL by the addition of pyridine; and thorough shaking then provides the acetylation reagent. The obtained acetylation reagent is stored in a brown bottle isolated from contact with, e.g., humidity, carbon dioxide, and so forth. A phenolphthalein solution is obtained by dissolving 1.0 g of phenolphthalein in 90 mL of ethyl alcohol (95 vol %) and bringing to 100 mL by the addition of deionized water. 35 g of special-grade potassium hydroxide is dissolved in 20 mL of water and this is brought to 1 L by the addition of ethyl alcohol (95 vol %). After standing for 3 days in an alkali-resistant container isolated from contact with, e.g., carbon dioxide, filtration is performed to obtain a potassium hydroxide solution. The obtained potassium hydroxide solution is stored in an alkali-resistant container. The factor for this potassium hydroxide solution is determined as follows: 25 mL of 0.5 mol/L hydrochloric acid is taken to an Erlenmeyer flask; several drops of the above-described phenolphthalein solution are added; titration is performed with the potassium hydroxide solution; and the factor is determined from the amount of the potassium hydroxide solution required for neutralization.

(2) Procedure (A) Main Test 1.0 g of the pulverized crystalline polyester is exactly weighed into a 200-mL roundbottom flask and exactly 5.0 mL of the above-described acetylation reactant is added from a whole pipette. When the sample is difficult to dissolve in the acetylation reagent, dissolution is carried out by the addition of a small amount of special-grade toluene.

A small funnel is mounted in the mouth of the flask and heating is then carried out by immersing approximately 1 cm of the bottom of the flask in a glycerol bath at approximately 97° C. In order to prevent the temperature at the neck of the flask from rising at this point due to the heat from the bath, thick paper in which a round hole has been made is preferably mounted at the base of the neck of the flask.

After 1 hour, the flask is taken off the glycerol bath and allowed to cool. After cooling, the acetic anhydride is hydrolyzed by adding 1 mL water from the funnel and shaking. In order to accomplish complete hydrolysis, the flask is again heated for 10 minutes on the glycerol bath. After cooling, the funnel and flask walls are washed with 5 mL of ethyl alcohol.

Several drops of the above-described phenolphthalein solution are added as the indicator and titration is performed using the above-described potassium hydroxide solution. The endpoint for the titration is taken to be the point at which the pale pink color of the indicator persists for approximately 30 seconds.

(B) Blank Test

Titration is performed using the same procedure as described above, but without using the crystalline polyester sample.

(3) The Hydroxyl Value is Calculated by Substituting the Obtained Results into the Following formula.

$$A=[\{(B-C)\times 28.05\times f\}/S]+D$$

Here, A is the hydroxyl value (mg KOH/g); B is the amount of addition (mL) of the potassium hydroxide solution in the blank test; C is the amount of addition (mL) of the potassium hydroxide solution in the main test; f is the factor for the potassium hydroxide solution; S is the sample (g); and D is the acid value (mg KOH/g) of the crystalline polyester.

<Method for Measuring the Acid Value of the Crystalline Polyester>

The acid value is the number of milligrams of potassium hydroxide required to neutralize the acid present in 1 g of a sample. The acid value of the crystalline polyester was measured in the present invention in accordance with JIS K 0070-1992. In specific terms it was measured according to the following procedure.

(1) Reagent Preparation

A phenolphthalein solution was obtained by dissolving 1.0 g of phenolphthalein in 90 mL of ethyl alcohol (95 volume %) and bringing to 100 mL by adding deionized water.

7 g of special-grade potassium hydroxide was dissolved in 5 mL of water and this was brought to 1 L by the addition of ethyl alcohol (95 volume %). This was introduced into an alkali-resistant container avoiding contact with, e.g., carbon dioxide, and allowed to stand for 3 days. Standing was followed by filtration to obtain a potassium hydroxide solution. The obtained potassium hydroxide solution was stored in an alkali-resistant container. The factor for this potassium hydroxide solution was determined from the amount of the potassium hydroxide solution required for neutralization when 25 mL of 0.1 mol/L hydrochloric acid was introduced into an Erlenmeyer flask, several drops of the aforementioned phenolphthalein solution were added, and titration was performed using the potassium hydroxide solution. The 0.1 mol/L hydrochloric acid used was prepared in accordance with JIS K 8001-1998.

(2) Procedure (A) Main Test 2.0 g of the pulverized crystalline polyester sample was exactly weighed into a 200-mL Erlenmeyer flask and 100 mL of a toluene:ethanol (2:1) mixed solution was added and dissolution was carried out over 5 hours. Several drops of the aforementioned phenolphthalein solution were then added as an indicator and titration was performed using the aforementioned potassium hydroxide solution. The titration endpoint was taken to be persistence of the faint pink color of the indicator for approximately 30 seconds.

(B) Blank Test

The same titration as in the above procedure was run, but without adding the sample (that is, with only the toluene:ethanol (2:1) mixed solution).

(3) The Obtained Results were Substituted into the Following Formula to Calculate the Acid Value.

$$A=[(C-B)\times f\times 5.61]/S$$

Here, A is the acid value (mg KOH/g); B is the amount of addition (mL) of the potassium hydroxide solution in the blank test; C is the amount of addition (mL) of the potassium hydroxide solution in the main test; f is the factor for the potassium hydroxide solution; and S is the sample (g).

<Method for Measuring the Occurrence (25% Ratio) of Crystalline Material Domains>

The 25% ratio is the percentage (number %) of the crystalline material that is present in the region that is within 25%, from the contour of the toner particle cross section, of the distance between this contour and the center point of the cross section.

The method for determining this 25% ratio is as follows.

The contour and center point of the toner particle cross section in the aforementioned STEM image are determined by the following method. The toner particle cross sections subjected to observation have a long diameter R (μm) that satisfies the relationship 0.9≤R/D4≤1.1 with respect to the weight-average particle diameter (D4) of the toner. The contour of the toner particle cross section is the contour along the surface of the toner particle observed in the STEM image. In addition, the centroid of the toner particle cross section is used for the center point of the toner particle cross section.

A line is drawn from the obtained center point to a point on the contour of the toner particle cross section. The location on this line that is 25%, from the contour, of the distance between the contour and the center point of the cross section is located.

This operation is carried out on the contour of the toner particle cross section for one time around, thus specifying the boundary line for 25% of the distance, from the contour for the toner particle cross section, between this contour and the center point of the cross section (FIG. 1).

Regarding reference signs in FIG. 1, 1 indicates release agent domain, 2 indicates crystalline polyester domain, and 3 indicates boundary line for 25% of the distance, from the contour for the toner particle cross section, between this contour and the center point of the cross section.

Based on the STEM image in which this 25% boundary line has been specified, the number of crystalline material domains (referred to below as A) in a single toner particle cross section is measured. In addition, the number of crystalline material domains (referred to below as B) present in the region within 25%, from the contour of the toner particle cross section, of the distance between the contour and the center point of the cross section is also measured on the single toner particle cross section.

The crystalline material domains present on the 25% boundary line are measured in the aforementioned "B".

The 25% ratio in the single toner particle cross section is then calculated using the following formula.

25% ratio for a single toner particle cross section={"B"/"A"}×100(%)

This is performed on 100 toner particle cross sections and the arithmetic average value thereof is then used as the 25% ratio.

<Measurement of the Tcw Number %>

Tcw refers to a toner particle that has both crystalline polyester domains and release agent domains. This number % was determined by identifying the crystalline material domains as described above and counting the particles having both domains in 100 toner particles that satisfied the relationship 0.9≤R/D4≤1.1.

<Measurement of the Crystalline Polyester Domain Coverage Ratio for the Release Agent Large Domains>

Using STEM images of the toner particle cross sections, the coverage ratio was determined as follows in the particle group composed of toner particles having crystalline polyester domains and release agent domains in a single particle. First, using STEM observation as described above, freehand measurement was carried out of the length of the circumference along the interface of the release agent large domains. Then, freehand measurement was similarly carried out of the length of the portion, of the release agent domains, that was in contact with crystalline polyester. The coverage ratio can be calculated from their ratio. The same calculation was performed on 100 toner particles satisfying the relationship 0.9≤R/D4≤1.1, and the arithmetic average value thereof was used as the crystalline polyester coverage ratio for the release agent domains.

<Method for Measuring the Thermal Conductivity>

(1) Preparation of the Measurement Sample

Two cylindrical measurement samples with a diameter of 25 mm and a height of 6 mm are fabricated by compression molding approximately 5 g of the toner (can vary with the specific gravity of the sample) for 60 seconds at approximately 20 MPa using a tablet compression molder in a 25° C. environment.

(2) Measurement of the Thermal Conductivity measurement instrument: TPS2500S Hot Disk thermal property analyzer
sample holder: room-temperature sample holder
sensor: standard attachment (RTK) sensor
software: Hot Disk Analysis 7

A measurement sample is placed on the mounting table platform of the room-temperature sample holder and the height of the table is adjusted to bring the surface of the measurement sample to the same height as the sensor.

The second measurement sample and also the metal attachment piece are placed on the sensor and pressure is applied using the bolt above the sensor. The pressure is adjusted to 30 cN·m using a torque wrench. The centers of the measurement sample and sensor are confirmed to be directly under the bolt.

The Hot Disk analysis is started and Bulk (Type I) is selected for the experiment type.

The following are input for the input items.
Available Probing Depth: 6 mm
Measurement Time: 40 s
Heating Power: 60 mW
Sample Temperature: 23° C.
TCR: 0.004679 $K^{-1}$
Sensor Type: Disk
Sensor Material Type: Kapton
Sensor Design: 5465
Sensor Radius: 3.189 mm The measurement is started once these have been input. After the completion of the measurement, the Calculate button is selected; Start Point: 10 and End Point: 200 are input; the Standard Analysis button is selected; and the Thermal Conductivity [W/mK] is calculated.

<Method for Measuring the Tetrahydrofuran (THF)-Insoluble Matter>

1 g of the toner is exactly weighed out and introduced into a thimble and subjected to Soxhlet extraction for 20 hours with 200 mL of THF. The thimble is then removed and dried in a vacuum for 20 hours at 40° C.; the residual mass is measured; and the tetrahydrofuran (THF)-insoluble matter of the resin component of the toner is calculated using the formula below.

The resin component of the toner is the component provided by subtracting the magnetic powder, charge control agent, wax component, external additive, and pigment from the toner. The THF-insoluble matter is calculated based on the resin component considering whether these contained materials are soluble or insoluble in THF in this measurement of the THF-insoluble matter.

THF-insoluble matter (%)=($W2-W3$)/($W1-W3-W4$)×100 where:
W1: mass of the toner
W2: residual mass
W3: mass of components not soluble in THF, other than the resin component of the toner
W4: mass of components soluble in THF, other than the resin component of the toner

EXAMPLES

The present invention is more specifically described in the following production examples and examples, but these in no way limit the present invention. Unless specifically indicated otherwise, the parts and % in the following blends are on a mass basis in all instances.

<Crystalline Polyester 1 Production>

100.0 mass parts of sebacic acid as acid monomer 1, 1.6 mass parts of stearic acid as acid monomer 2, and 89.3 mass parts of 1,9-nonanediol as the alcohol monomer were introduced into a reaction vessel fitted with a nitrogen introduction line, water separator line, stirrer, and thermocouple. The temperature was raised to 140° C. while stirring and a reaction was run under a nitrogen atmosphere for 8 hours while distilling out water at normal pressure and heating at 140° C. 0.57 mass parts of tin dioctylate was then added and a reaction was subsequently run while raising the temperature to 200° C. at 10° C./hour. After 200° C. had been reached, a reaction was run for 2 hours, followed by reducing the pressure within the reaction vessel to 5 kPa or less and reacting at 200° C. while monitoring the molecular weight to obtain a crystalline polyester 1. The properties of the obtained crystalline polyester 1 are given in Table 1.

<Crystalline Polyesters 2 to 8 Production Example>

Crystalline polyesters 2 to 8 were obtained proceeding as in the Crystalline Polyester 1 Production, but changing the alcohol monomer and acid monomers 1 and 2 as shown in Table 1 and adjusting the reaction time and temperature so as to provide the desired properties. The properties of the obtained crystalline polyesters are given in Table 1. Crystalline polyesters 1 to 8 had clear endothermic peaks in measurement by differential scanning calorimetry (DSC).

loidal ferrous hydroxide. An oxidation reaction was run while holding this aqueous solution at 85° C. and blowing in air at 20 L/minute to obtain a slurry that contained core particles.

The obtained slurry was filtered and washed on a filter press, after which the core particles were reslurried by redispersion in water. To this reslurry liquid was added sodium silicate to provide 0.20 mass % as silicon per 100 parts of the core particles; the pH of the slurry was adjusted to 6.0; and magnetic iron oxide particles having a silicon-rich surface were obtained by stirring. The obtained slurry was filtered and washed with a filter press and was reslurried with deionized water. Into this reslurry liquid (solids fraction=50 g/L) was introduced 500 g (10 mass % relative to the magnetic iron oxide) of the ion-exchange resin SK110 (Mitsubishi Chemical Corporation) and ion-exchange was carried out for 2 hours with stirring. This was followed by removal of the ion-exchange resin by filtration on a mesh; filtration and washing on a filter press; and drying and crushing to obtain a magnetic iron oxide having a number-average particle diameter of 0.23

<Silane Compound Production>

30 parts of isobutyltrimethoxysilane was added dropwise to 70 parts of deionized water while stirring. While holding this aqueous solution at pH 5.5 and a temperature of 55° C., hydrolysis was then carried out by dispersing for 120 minutes using a dispersing impeller at a peripheral velocity of 0.46 m/second. This was followed by bringing the pH of the aqueous solution to 7.0 and cooling to 10° C. to stop the hydrolysis reaction. A silane compound-containing aqueous solution was obtained proceeding in this manner.

<Magnetic Body 1 Production>

100 parts of the magnetic iron oxide was introduced into a high-speed mixer (Model LFS-2 from Fukae Powtec Corporation) and 8.0 parts of the silane compound-containing aqueous solution was added dropwise over 2 minutes while stirring at a rotation rate of 2,000 rpm. This was followed by mixing and stirring for 5 minutes. Then, in order to raise the adherence of the silane compound, drying was carried out for 1 hour at 40° C. and, after the moisture had

TABLE 1

| | alcohol monomer | acid monomer 1 | acid monomer 2 | weight-average molecular weight (Mw) | melting point (° C.) | acid value (mg KOH/g) | hydroxyl value (mg KOH/g) |
|---|---|---|---|---|---|---|---|
| crystalline polyester 1 | 1,9-nonanediol | decanedioic acid (sebacic acid) | stearic acid | 38000 | 70 | 2.0 | 5.5 |
| crystalline polyester 2 | 1,10-decanediol | decanedioic acid (sebacic acid) | lauric acid | 38000 | 72 | 2.2 | 4.9 |
| crystalline polyester 3 | 1,12-dodecanediol | decanedioic acid (sebacic acid) | behenic acid | 20500 | 79 | 2.1 | 5.3 |
| crystalline polyester 4 | 1,10-decanediol | decanedioic acid (sebacic acid) | stearic acid | 45000 | 58 | 1.5 | 3.5 |
| crystalline polyester 5 | 1,4-butanediol | decanedioic acid (sebacic acid) | stearic acid | 16000 | 65 | 4.2 | 7.0 |
| crystalline polyester 6 | 1,10-decanediol | decanedioic acid (sebacic acid) | stearic acid | 55000 | 76 | 1.1 | 3.8 |
| crystalline polyester 7 | 1,6-hexanediol | hexadecanedicarboxylic acid | lignoceric acid | 33000 | 81 | 4.5 | 5.3 |
| crystalline polyester 8 | 1,18-octadecanediol | decanedioic acid (sebacic acid) | — | 16000 | 102 | 5.0 | 38.3 |

<Magnetic Iron Oxide Production Example>

55 liters of a 4.0 mol/L aqueous sodium hydroxide solution was mixed with stirring into 50 liters of an aqueous ferrous sulfate solution containing $Fe^{2+}$ at 2.0 mol/L to obtain an aqueous ferrous salt solution that contained colbeen reduced, the mixture was dried for 3 hours at 110° C. to develop the condensation reaction of the silane compound. This was followed by crushing and passage through a screen having an aperture of 100 μm to obtain a magnetic body 1.

<Colorant 1 for Nonmagnetic Toner>

A commercial carbon black 1 was used as the colorant for the nonmagnetic toner. The properties of the carbon black 1 used were as follows: number-average primary particle diameter: 31 nm, DBP absorption: 40 mL/100 g, work function: 4.71 eV.

The release agents used in these examples and comparative examples are given in Table 2 below.

TABLE 2

|  | designation | melting point (° C.) |
|---|---|---|
| release agent 1 | dibehenyl sebacate | 74 |
| release agent 2 | paraffin wax 1 | 75 |
| release agent 3 | distearyl sebacate | 66 |
| release agent 4 | behenyl behenate | 72 |
| release agent 5 | paraffin wax 2 | 86 |

<Toner 1 Production Example>

An aqueous medium containing a dispersing agent was obtained by introducing 450 parts of a 0.1 mol/L aqueous $Na_3PO_4$ solution into 720 parts of deionized water, heating to 60° C., and then adding 67.7 parts of a 1.0 mol/L aqueous $CaCl_2$ solution. 1,6-hexanediol diacrylate was used as a crosslinking agent.

| styrene | 78.0 parts |
|---|---|
| n-butyl acrylate | 22.0 parts |
| 1,6-hexanediol diacrylate | 0.65 parts |
| iron complex of a monoazo dye | 1.5 parts |
| (T-77, Hodogaya Chemical Co., Ltd.) | |
| magnetic body 1 | 90.0 parts |
| amorphous polyester resin | 5.0 parts |

(saturated polyester resin obtained by the condensation polymerization reaction of terephthalic acid with the 2 mol adduct of ethylene oxide on bisphenol A; number-average molecular weight (Mn)=5,000, acid value=6 mg KOH/g, glass transition temperature (Tg)=68° C.)

A monomer composition was obtained by mixing/dispersing the preceding formulation to uniformity using an attritor (Mitsui Miike Chemical Engineering Machinery Co., Ltd.). This monomer composition was heated to 63° C., and into this were mixed and dissolved 7.0 mass parts of the crystalline polyester 1, and, as release agents, 10.0 mass parts of the release agent 1 and 10.0 mass parts of the release agent 2.

This monomer composition was introduced into the aqueous medium described above and granulation was performed by stirring for 10 minutes at 12,000 rpm with a T.K. Homomixer (Tokushu Kika Kogyo Co., Ltd.) at 60° C. under an $N_2$ atmosphere. Then, while stirring with a paddle stirring blade, 5.0 mass parts of the polymerization initiator t-butyl peroxypivalate was introduced and heating to 70° C. was carried out and a reaction was run for 4 hours. After the completion of the reaction, the suspension was heated to 100° C. and was held for 2 hours. In the cooling step following this, water at normal temperature was introduced into the suspension to cool the suspension at a rate of 150° C./minute from 100° C. to 50° C.; this was followed by holding for 100 minutes at 50° C. and spontaneous cooling to normal temperature (in the following, normal temperature with reference to toner production is 25° C.) The crystallization temperature of crystalline polyester 1 was 53° C. This was followed by dissolution of the dispersing agent by the addition of hydrochloric acid to the suspension with thorough washing and then filtration and drying to obtain a toner base particle 1.

Toner 1 was obtained by mixing 100 parts of toner base particle 1 using a Mitsui Henschel mixer (Mitsui Miike Chemical Engineering Machinery Co., Ltd.) with 0.8 parts of a hydrophobic silica fine powder having a BET specific surface area of 300 $m^2/g$ and a number-average primary particle diameter of 8 nm.

The production method and formulation are given in Table 3 and the properties are given in Table 4.

<Toners 2 to 18 and Comparative Toners 1 to 3 Production Example>

Toners 2 to 18 and comparative toners 1 to 3 were obtained proceeding as in the Toner 1 Production Example, but changing the toner formulation and production method in the Toner 1 Production Example as shown in Table 3. The properties are given in Table 4.

<Toner 19 Production Example>

Toner 19 was obtained proceeding as in the Toner 1 Production Example, but using carbon black 1 in place of the magnetic body 1 in the Toner 1 Production Example and changing the toner formulation and production method as shown in Table 3. The resulting properties are given in Table 4.

For all of toners 1 to 19 and comparative toners 1 to 3, the glass transition temperature was at least 48° C. and not more than 60° C. and the weight-average particle diameter (D4) was at least 6.5 μm and not more than 9.0 μm.

The "150° C./minute" condition indicates the following: in the cooling step as in the Toner 1 Production Example, the suspension is cooled at a rate of 150° C./minute from 100° C. to the neighborhood of the crystallization temperature of the crystalline material, followed by holding at the same temperature for 100 minutes and then spontaneous cooling to normal temperature.

The stopping temperature and the holding temperature in the cooling step were determined by checking the crystallization temperature of the crystalline material in advance.

Similarly, the "150° C./minute" condition and "0.5° C./minute" refer, respectively, to the same temperature maintenance and spontaneous cooling as above, except that in the cooling step the suspension is cooled at a rate of 150° C./minute or 0.5° C./minute from 100° C. to the neighborhood of the crystallization temperature of the crystalline polyester.

TABLE 3

| Toner No. | crystalline polyester No. | crystalline polyester mass parts | release agent 1 No. | release agent 1 mass parts | release agent 2 No. | release agent 2 mass parts | colorant designation | colorant mass parts | amorphous polyester mass parts | crosslinking agent mass parts | cooling rate |
|---|---|---|---|---|---|---|---|---|---|---|---|
| 1 | 1 | 7.0 | 1 | 10.0 | 2 | 10.0 | magnetic body 1 | 90.0 | 5.0 | 0.65 | 150° C./min |
| 2 | 2 | 7.0 | 3 | 10.0 | 2 | 10.0 | magnetic body 1 | 90.0 | 5.0 | 0.65 | 150° C./min |

TABLE 3-continued

| Toner No. | crystalline polyester No. | crystalline polyester mass parts | release agent 1 No. | release agent 1 mass parts | release agent 2 No. | release agent 2 mass parts | colorant designation | colorant mass parts | amorphous polyester mass parts | crosslinking agent mass parts | cooling rate |
|---|---|---|---|---|---|---|---|---|---|---|---|
| 3 | 3 | 7.0 | 4 | 10.0 | 2 | 10.0 | magnetic body 1 | 90.0 | 5.0 | 0.65 | 150° C./min |
| 4 | 8 | 7.0 | 1 | 10.0 | 5 | 10.0 | magnetic body 1 | 90.0 | 5.0 | 0.65 | 150° C./min |
| 5 | 4 | 7.0 | 1 | 10.0 | 2 | 10.0 | magnetic body 1 | 90.0 | 5.0 | 0.65 | 150° C./min |
| 6 | 5 | 7.0 | 1 | 10.0 | 2 | 10.0 | magnetic body 1 | 90.0 | 5.0 | 0.65 | 150° C./min |
| 7 | 6 | 7.0 | 1 | 10.0 | 2 | 10.0 | magnetic body 1 | 90.0 | 5.0 | 0.65 | 150° C./min |
| 8 | 1 | 7.0 | 1 | 2.0 | 2 | 3.0 | magnetic body 1 | 90.0 | 5.0 | 0.65 | 150° C./min |
| 9 | 1 | 7.0 | 1 | 1.0 | 2 | 2.0 | magnetic body 1 | 90.0 | 5.0 | 0.65 | 150° C./min |
| 10 | 1 | 7.0 | 1 | 10.0 | 2 | 15.0 | magnetic body 1 | 90.0 | 5.0 | 0.65 | 150° C./min |
| 11 | 1 | 7.0 | 1 | 15.0 | 2 | 15.0 | magnetic body 1 | 90.0 | 5.0 | 0.65 | 150° C./min |
| 12 | 1 | 7.0 | — | 0.0 | 2 | 25.0 | magnetic body 1 | 90.0 | 5.0 | 0.65 | 150° C./min |
| 13 | 7 | 5.0 | 1 | 5.0 | 2 | 15.0 | magnetic body 1 | 90.0 | 5.0 | 0.65 | 120° C./min |
| 14 | 1 | 5.0 | 1 | 5.0 | 2 | 5.0 | magnetic body 1 | 90.0 | 5.0 | 0.65 | 100° C./min |
| 15 | 1 | 12.0 | 1 | 10.0 | 2 | 10.0 | magnetic body 1 | 90.0 | 5.0 | 0.65 | 135° C./min |
| 16 | 1 | 15.0 | 1 | 10.0 | 2 | 10.0 | magnetic body 1 | 90.0 | 5.0 | 0.65 | 150° C./min |
| 17 | 1 | 5.0 | 1 | 8.0 | 2 | 8.0 | magnetic body 1 | 90.0 | 5.0 | 0.5 | 120° C./min |
| 18 | 1 | 7.0 | 1 | 10.0 | 2 | 10.0 | magnetic body 1 | 90.0 | 20.0 | 0.65 | 150° C./min |
| 19 | 1 | 7.0 | 1 | 10.0 | 2 | 10.0 | carbon black 1 | 8.0 | 5.0 | 0.65 | 150° C./min |
| comparative 1 | 1 | 7.0 | 1 | 10.0 | 2 | 10.0 | magnetic body 1 | 90.0 | 5.0 | 0.85 | 150° C./min |
| comparative 2 | 1 | 7.0 | 1 | 10.0 | 2 | 10.0 | magnetic body 1 | 90.0 | 5.0 | 0.4 | 150° C./min |
| comparative 3 | 1 | 7.0 | — | 0.0 | 2 | 15.0 | magnetic body 1 | 90.0 | 5.0 | 0.5 | 50° C./min |

<Comparative Toner 4 Production>
(Synthesis of Low-Molecular Weight Polyester 1)
The following starting materials were introduced into a heat-dried two-neck flask while nitrogen was being introduced.
2 mol adduct of ethylene oxide on bisphenol A: 229 parts
3 mol adduct of propylene oxide on bisphenol A: 529 parts
terephthalic acid: 208 parts
adipic acid: 46 parts
dibutyltin oxide: 2 parts After the interior of the system had been substituted by nitrogen using a pressure reduction procedure, stirring was performed for 5 hours at 215° C. Then, while continuing to stir, the temperature was gradually raised to 230° C. under reduced pressure and was held for an additional 3 hours. This was followed by the introduction to the two-neck flask of 44 parts of trimellitic anhydride and reaction for 2 hours at 180° C. and normal pressure to obtain [low-molecular weight polyester 1].

(Release Agent Dispersion 1 Production)
release agent 1: 10 parts
low-molecular weight polyester 1: 25 parts
ethyl acetate: 67.5 parts
deionized water: 200.0 parts The preceding were mixed; 3-mm zirconia was introduced at a 60% volume ratio; and, using a Model No. 5400 Paint Conditioner (Red Devil Equipment Co. (USA)), dispersion was carried out until a weight-average particle diameter (D4) of 400 nm was reached, thus yielding a release agent dispersion 1.

(Release Agent Dispersion 2 Production)
A release agent dispersion 2 was produced proceeding as in Release Agent Dispersion 1 Production, but changing from release agent 1 to release agent 2 and proceeding so as to obtain a weight-average particle diameter (D4) of 1.5 μm.

(Synthesis of Amorphous Resin 1)
The following starting materials were charged to a heat-dried two-neck flask while introducing nitrogen.

| | |
|---|---|
| polyoxypropylene(2.2)-2,2-bis(4-hydroxyphenyl)propane | 30 parts |
| polyoxyethylene(2.2)-2,2-bis(4-hydroxyphenyl)propane | 34 parts |

-continued

| | |
|---|---|
| terephthalic acid | 30 parts |
| fumaric acid | 6.0 parts |
| dibutyltin oxide | 0.1 parts |

The interior of the system was substituted with nitrogen by a reduced pressure procedure followed by stirring for 5 hours at 215° C. Then, while continuing to stir, the temperature was gradually raised to 230° C. under reduced pressure and holding was carried out for an additional 2 hours. When a viscous state had been assumed, air cooling was carried out and the reaction was stopped to yield an amorphous resin 1, which was an amorphous polyester.

(Resin Particle Dispersion 1 Production)
50.0 parts of the amorphous resin 1 was dissolved in 200.0 parts of ethyl acetate and 3.0 parts of an anionic surfactant (sodium dodecylbenzenesulfonate) along with 200.0 mass parts of deionized water were added. Heating to 40° C. was carried out; stirring was performed for 10 minutes at 8,000 rpm using an emulsifying device (Ultra-Turrax T-50, IKA); and the ethyl acetate was then removed by evaporation to obtain a resin particle dispersion 1.

(Colorant Dispersion 1 Preparation)
carbon black 1: 50.0 parts
Neogen RK (DKS Co. Ltd.) cationic surfactant: 5.0 parts
deionized water: 200.0 mass parts These materials were introduced into a heat-resistant glass vessel; dispersion was carried out for 5 hours using a Model No. 5400 Paint Conditioner (Red Devil Equipment Co. (USA)); and the glass beads were removed using a nylon mesh to obtain a colorant dispersion 1 having a median diameter (D50) on a volume basis of 220 nm and a solids amount of 20 mass %.

(Comparative Toner 4 Production Step)
colorant dispersion 1: 25.0 parts
release agent dispersion 1: 30.0 parts
release agent dispersion 2: 30.0 parts
10 mass % aqueous polyaluminum chloride solution: 1.5 parts The preceding were mixed in a round stainless steel flask and were mixed and dispersed with an Ultra-Turrax T50 from IKA followed by holding for 60 minutes at 45° C. while stirring. The resin particle dispersion 1 (50 mass parts) was then gently added; the pH in the system was brought to 6 with a 0.5 mol/L aqueous sodium hydroxide solution; the stainless steel flask was subsequently sealed; and heating to 96° C. was performed while continuing to stir using a magnetic seal. While the temperature was being ramped up, supplementary additions of the aqueous sodium hydroxide solution were made as appropriate so the pH did not fall below 5.5. Holding for 5 hours at 96° C. was then carried out.

This was followed by cooling, filtration, thorough washing with deionized water, and then solid-liquid separation using Nutsche-type suction filtration. Redispersion into 3 L of deionized water was performed and stirring was carried out for 15 minutes at 300 rpm. This was repeated an additional 5 times, and, once the pH of the filtrate had reached 7.0, solid-liquid separation was performed using filter paper and Nutsche-type suction filtration. Vacuum drying was continued for 12 hours to obtain a comparative toner base particle 4.

Comparative toner 4 was then obtained by mixing 100 mass parts of comparative toner base particle 4 using a Mitsui Henschel mixer (Mitsui Miike Chemical Engineering Machinery Co., Ltd.) with 0.8 mass parts of a hydrophobic silica fine powder having a BET value of 300 m$^2$/g and a primary particle diameter of 8 nm. The properties of the obtained comparative toner 4 are given in Table 4.

process speed was brought to 200 mm/second, which was faster than the conventional process speed. The modified LBP3100 was also modified to enable adjustment of the fixation temperature at the fixing unit. Operating in a normal-temperature, normal-humidity environment (temperature=25.0° C., humidity=50% RH), the fixing unit was removed during the evaluation and the following evaluation was carried out in a condition in which the fixing unit was satisfactorily cooled using, for example, a fan. The fixing performance of the toner can be rigorously evaluated with good reproducibility by cooling the fixing nip region, which has assumed an elevated temperature after image output, by having satisfactorily cooled the fixing unit after an evaluation. Fox River Bond paper (110 g/m$^2$) was used as the fixing media. The use of a media which is a thick paper and which has relatively large peaks and valleys on the media surface enables a rigorous evaluation of the fixing performance under circumstances in which peeling can readily occur.

First, the toner laid-on level was adjusted to provide a toner laid-on level on the fixing media of 0.90 mg/cm$^2$. Then, the fixing unit was cooled to 15° C. and 10 prints of a solid image were continuously fixed with the heater temperature of the fixing unit set to 230° C. (referred to below as the fixation temperature). This was followed by the execution of the evaluation down to 190° C. with the fixation temperature being reduced in 5° C. steps. The 10 output images were evaluated according to the following assessment criteria based on a visual assessment of the cold offset.

TABLE 4

| Toner No. | Te (° C.) | G'(Te) (×10$^7$ Pa) | number of small domain | 25% ratio (%) | maximum diameter of large domain (μm) | percentage of area taken up by large domains (%) | Tcw (number %) | release agent domain coverage ratio by crystalline polyester domain (%) | thermal conductivity of the toner (W/m · K) | amount of THF-insoluble matter (%) |
|---|---|---|---|---|---|---|---|---|---|---|
| 1 | 60.1 | 41.2 | 301 | 69.8 | 2.5 | 20.1 | 90.0 | 89.8 | 0.238 | 24.1 |
| 2 | 59.8 | 40.1 | 298 | 70.1 | 2.5 | 19.8 | 90.1 | 90.2 | 0.234 | 24.8 |
| 3 | 58.0 | 40.8 | 295 | 70.0 | 2.5 | 20.4 | 90.2 | 88.9 | 0.229 | 25.1 |
| 4 | 62.1 | 39.8 | 298 | 60.9 | 2.5 | 20.3 | 89.8 | 90.2 | 0.241 | 25.4 |
| 5 | 57.3 | 41.1 | 305 | 80.0 | 2.5 | 20.4 | 90.0 | 90.4 | 0.238 | 24.8 |
| 6 | 62.9 | 39.9 | 321 | 54.8 | 2.5 | 19.8 | 89.8 | 89.9 | 0.241 | 24.6 |
| 7 | 59.9 | 38.9 | 297 | 70.2 | 2.5 | 20.6 | 90.3 | 87.9 | 0.236 | 24.1 |
| 8 | 66.8 | 8.9 | 149 | 69.2 | 1.0 | 10.1 | 78.0 | 89.5 | 0.235 | 25.1 |
| 9 | 67.6 | 8.1 | 118 | 70.1 | 0.8 | 6.8 | 73.4 | 89.9 | 0.241 | 24.7 |
| 10 | 63.2 | 11.5 | 342 | 69.8 | 3.6 | 39.8 | 91.2 | 90.1 | 0.240 | 24.6 |
| 11 | 62.1 | 13.2 | 408 | 69.8 | 4.2 | 48.5 | 91.8 | 90.4 | 0.239 | 25.3 |
| 12 | 61.5 | 35.1 | 364 | 70.1 | 2.9 | 31.2 | 72.6 | 80.1 | 0.238 | 25.4 |
| 13 | 66.9 | 6.8 | 89 | 84.2 | 2.3 | 19.1 | 80.3 | 41.2 | 0.243 | 25.1 |
| 14 | 69.9 | 4.4 | 51 | 68.7 | 1.5 | 14.2 | 84.5 | 89.6 | 0.239 | 24.9 |
| 15 | 59.8 | 15.1 | 481 | 69.1 | 2.7 | 22.4 | 90.2 | 88.8 | 0.241 | 24.3 |
| 16 | 52.1 | 64.8 | 598 | 68.0 | 2.7 | 23.4 | 92.0 | 89.1 | 0.237 | 26.0 |
| 17 | 50.8 | 4.3 | 99 | 70.8 | 2.0 | 17.9 | 84.6 | 91.4 | 0.241 | 12.4 |
| 18 | 62.0 | 9.7 | 213 | 70.4 | 2.3 | 18.9 | 90.9 | 91.1 | 0.243 | 24.7 |
| 19 | 62.1 | 9.6 | 298 | 69.8 | 2.5 | 20.1 | 89.3 | 88.5 | 0.152 | 23.9 |
| comparative 1 | 74.5 | 10.1 | 302 | 70.0 | 2.5 | 20.3 | 90.4 | 89.1 | 0.243 | 52.1 |
| comparative 2 | 47.4 | 10.3 | 307 | 71.1 | 2.5 | 20.4 | 89.4 | 89.7 | 0.241 | 9.3 |
| comparative 3 | 68.1 | 1.2 | 55 | 70.8 | 2.5 | 21.1 | 91.2 | 51.1 | 0.238 | 13.8 |
| comparative 4 | 64.5 | 2.3 | 4 | 24.8 | 1.0 | 34.8 | 0.0 | 0.0 | 0.210 | 21.1 |

In the table, the "25% ratio" gives the number % of domains present within 25%, from the toner particle cross section contour, of the distance between the contour and the center point of the cross section.

Example 1

<Cold offset resistance>

A modified LBP3100 printer from Canon Inc. is used in the image output evaluations. One modification was that the The results of the evaluation are given in Table 5. A score of C or better was assessed as excellent for the present invention.

A: cold offset was not produced down to 190° C.
B: cold offset was produced at 190° C. or above but below 200° C.
C: cold offset was produced at 200° C. or above but below 210° C.
D: cold offset was produced at 210° C. or above <Fine Line Reproducibility>

Figure 3:
FIG. 3 shows an example of the character image used in the evaluations.

The evaluation was performed in a 23° C., 50% RH environment using the modified machine used in the evaluation of the cold offset resistance as the image-forming apparatus. Due to the increase in the printing speed, a rigorous evaluation in which the developing performance of the toner is also reduced can be carried out. B5 color laser copy paper (40 g/m², Canon Inc.) was used for the fixing media. A smaller area for the media facilitates excessive retention of heat by the fixing unit, and the amount of heat taken in from the fixing unit by the paper is made small by using a thin paper. The execution of such a test facilitates the receipt of excess heat by the toner and thus enables a rigorous evaluation of fine line collapse. 3-point and 5-point images of the characters shown in FIG. 3 were formed and were rankwise evaluated as indicated below. The results of the evaluation for toner 1 were that an excellent, collapse-free image could be obtained. The results of the evaluations are given in Table 5. A score of C or better was assessed as excellent for the present invention.

A: both the 3-point and 5-point are clear and easily readable

B: the 3-point exhibits partial collapse but is legible; the 5-point is clear and easily readable C: partially illegible characters are produced at 3 points; the 5-point exhibits partial collapse but is legible D: at 3 points, almost all of the characters are illegible; the condition at 5 points is also partial or complete illegibility <Fogging after Heat-Cycling Holding>

The evaluation was performed in a 23° C., 50% RH environment using the modified machine used in the evaluation of the cold offset resistance as the image-forming apparatus. Due to the increase in the printing speed, a rigorous evaluation in which the developing performance of the toner is also reduced can be carried out. In addition, a modified cartridge that incorporated a small-diameter developing sleeve having a diameter of 10 mm was used as the cartridge.

When a cartridge incorporating a small-diameter developing sleeve is used, the nip between the developing sleeve and the developing blade is narrowed and the charge-imparting performance for the toner becomes unfavorable and as a consequence the fogging can be rigorously evaluated. A4 color laser copy paper (80 g/m², Canon Inc.) was used for the fixing media.

Toner 1 was subjected to holding in a heat-cycling environment, see below, and was used filled into the aforementioned modified cartridge. A horizontal line chart with a print percentage of 4% was output in a low-temperature, low-humidity environment (15° C./10% RH), and after this two solid-white prints were made and the fogging on the second of these was measured by the following method.

The fogging is measured using a Reflectometer Model TC-6DS from Tokyo Denshoku Co., Ltd. A green filter is used for the filter.

fogging (reflectance) (%)=reflectance (%) of reference paper−reflectance (%) of the sample solid white area The results of the evaluations are given in Table 5.

The evaluation criteria for the fogging are given below. A score of C or better was assessed as excellent for the present invention.

A: less than 1.5%
B: at least 1.5% and less than 2.0%
C: at least 2.0% and less than 3.0%
D: at least 3.0%

Holding in a Heat-Cycling Environment 100 g of the toner is placed in a thermostatted chamber adjusted to a temperature of 21° C. and a humidity of 90% and aging treatment is carried out for 24 hours.

After this, the temperature is raised at a pace of 12° C. per 1 hour to adjust to 57° C. and 90% over 3 hours.

After holding for 3 hours in this condition, the temperature is lowered at a pace of 12° C. per 1 hour to return to 21° C. and 90%. After holding for 3 hours the temperature is again raised. Proceeding in this manner, ramp-up and ramp-down were carried out ten times, as shown in FIG. 1, using temperatures and humidities of 21° C./90% and 57° C./90%.

This mode, by applying sharp heat fluctuations to the toner and repeating a high temperature and low temperature a number of times, promotes mass transfer in the toner particle interior and facilitates outmigration of the crystalline material to the toner particle surface. As a consequence, this is a rigorous mode for the toner. When the crystalline material outmigrates to the toner particle surface with holding in this environment, the external additive can embed into the toner base particle and the developing performance such as anti-fogging performance declines.

Examples 2 to 19 and Comparative Examples 1 to 4

The same evaluations as in Example 1 were carried out, but changing toner 1 in Example 1 to toners 2 to 19 and comparative toners 1 to 4. In Example 19, the evaluation was performed after the image-forming apparatus had been modified to enable output with nonmagnetic toner. The results of these evaluations are given in Table 5.

TABLE 5

| | toner No. | evaluation 1 (cold offset) | evaluation 2 (fine line reproducibility) | evaluation 3 (fogging after heating cycling) |
| --- | --- | --- | --- | --- |
| Example 1 | toner 1 | A | A | A(1.2) |
| Example 2 | toner 2 | A | A | A(1.2) |
| Example 3 | toner 3 | A | A | A(1.4) |
| Example 4 | toner 4 | A | A | A(0.9) |
| Example 5 | toner 5 | A | A | B(1.8) |
| Example 6 | toner 6 | B (190° C.) | A | A(1.0) |
| Example 7 | toner 7 | A | A | B(1.7) |
| Example 8 | toner 8 | B (190° C.) | A | A(1.0) |
| Example 9 | toner 9 | B (195° C.) | A | A(0.9) |
| Example 10 | toner 10 | A | B | A(1.4) |
| Example 11 | toner 11 | A | C | B(1.6) |
| Example 12 | toner 12 | B (190° C.) | B | A(1.4) |
| Example 13 | toner 13 | B (195° C.) | B | B(1.7) |
| Example 14 | toner 14 | C (200° C.) | C | A(0.8) |
| Example 15 | toner 15 | A | A | B(1.8) |
| Example 16 | toner 16 | A | A | C(2.2) |
| Example 17 | toner 17 | A | C | C(2.5) |
| Example 18 | toner 18 | B (190° C.) | A | A(1.1) |
| Example 19 | toner 19 | B (190° C.) | A | A(1.2) |
| Comparative Example 1 | comparative toner 1 | D (215° C.) | A | A(1.2) |
| Comparative Example 2 | comparative toner 2 | A | A | D(3.6) |
| Comparative Example 3 | comparative toner 3 | B (190° C.) | D | A(1.1) |
| Comparative Example 4 | comparative toner 4 | B (195° C.) | D | B(1.7) |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-101239, filed May 20, 2016, which is hereby incorporated by reference herein in its entirety.

What is claimed is:

1. A toner comprising toner particles, each of which contains a binder resin and a colorant, wherein
an onset temperature Te (° C.) of a storage elastic modulus E' obtained in a powder dynamic viscoelastic measurement on the toner is at least 50° C. and not more than 70° C., and
a value at Te (° C.) of a storage elastic modulus G' obtained in a pellet dynamic viscoelastic measurement on the toner is at least $4.0 \times 10^7$ Pa and not more than $1.0 \times 10^{10}$ Pa.

2. The toner according to claim 1, wherein
the toner particles each contain a crystalline material, and
small domains of the crystalline material having a long diameter of at least 50 nm and not more than 500 nm are present in the cross section of the toner particle observed with a transmission electron microscope, and the average number of these small domains observed in this cross section is at least 50 and not more than 500.

3. The toner according to claim 2, wherein
large domains of the crystalline material having a long diameter of at least 1.0 μm and not more than 4.0 μm are present in the cross section of the toner particle observed with a transmission electron microscope, and an area taken up by the large domains of the crystalline material occupies at least 10.0% and not more than 40.0% of an area of the cross section of the toner particle.

4. The toner according to claim 3, wherein
the crystalline material contains a crystalline polyester and a release agent, and
in observation of the cross section of the toner particles with a transmission electron microscope,
the percentage of toner particles in which domains of the crystalline polyester and domains of the release agent are observed in a single particle is at least 70 number % in the toner,
the large domains are the domains of the release agent, and
in a particle group formed of the toner particles in which the domains of the crystalline polyester and the domains of the release agent are observed in a single particle, the average coverage ratio of the large domains of the release agent by the domains of the crystalline polyester is at least 80%.

5. The toner according to claim 1, wherein
the toner particles each contain a crystalline material, and
domains of the crystalline material are present in the cross section of the toner particle observed with a transmission electron microscope, and at least 60 number % and not more than 100 number % of the domains of the crystalline material are present in a region that is within 25%, from a contour of the cross section, of a distance between the contour and the center point of the cross section.

* * * * *